US012696334B2

(12) United States Patent
Lee

(10) Patent No.: US 12,696,334 B2
(45) Date of Patent: Jul. 28, 2026

(54) ELECTRONIC DEVICE FOR SUPPORTING DUAL SIM AND CELLULAR COMMUNICATION CONVERTING METHOD OF ELECTRONIC DEVICE

(71) Applicant: Samsung Electronics Co., Ltd., Suwon-si (KR)

(72) Inventor: Kyoungho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 504 days.

(21) Appl. No.: 18/168,973

(22) Filed: Feb. 14, 2023

(65) Prior Publication Data

US 2023/0199887 A1 Jun. 22, 2023

Related U.S. Application Data

(63) Continuation of application No. PCT/KR2021/012525, filed on Sep. 14, 2021.

(30) Foreign Application Priority Data

Sep. 25, 2020 (KR) ......................... 10-2020-0124998

(51) Int. Cl.
*H04W 76/16* (2018.01)
*H04W 24/08* (2009.01)
(Continued)

(52) U.S. Cl.
CPC ........... *H04W 76/16* (2018.02); *H04W 24/08* (2013.01); *H04W 68/005* (2013.01); *H04W 88/06* (2013.01)

(58) Field of Classification Search
CPC ... H04W 76/16; H04W 24/08; H04W 68/005; H04W 88/06; H04W 8/183; H04W 48/18;
(Continued)

(56) References Cited

U.S. PATENT DOCUMENTS 10,506,666 B2    12/2019    Rice et al.
10,536,918 B2     1/2020    Basu Mallick et al.
(Continued)

FOREIGN PATENT DOCUMENTS

KR    10-2019-0115466 A    10/2019
KR    10-2020-0056460 A    5/2020
(Continued)

OTHER PUBLICATIONS

International Search Report dated Dec. 8, 2021, issued in International Application No. PCT/KR2021/012525.
(Continued)

*Primary Examiner* — Christopher T Wyllie
*Assistant Examiner* — Alyssa Williams
(74) *Attorney, Agent, or Firm* — Jefferson IP Law, LLP

(57) ABSTRACT

An electronic device and method thereof are provided. The electronic device includes a first subscriber identity module (SIM) for storing a first profile related to a first cellular network, a second SIM for storing a second profile related to a second cellular network, a wireless communication circuit including a radio frequency (RF) resource for performing data transmission or reception through one of the first cellular network or the second cellular network, and a communication processor configured to detect activation of a data transmission operation through the first cellular network, assign the RF resource to the first SIM during a first time, measure a quality of a channel corresponding to the first cellular network during the first time, maintain a state in which the RF resource is assigned to the first SIM during a second time, and reassign the RF resource to the second SIM after the second time expires.

15 Claims, 10 Drawing Sheets

(51) Int. Cl.
  *H04W 68/00* (2009.01)
  *H04W 88/06* (2009.01)

(58) Field of Classification Search
  CPC ..... H04W 76/36; H04W 76/27; H04W 24/10;
  H04W 68/02
  See application file for complete search history.

(56) References Cited

U.S. PATENT DOCUMENTS

| | | | |
|---|---|---|---|
| 10,568,073 | B2 | 2/2020 | Pathak et al. |
| 10,771,956 | B1 | 9/2020 | Sevindik et al. |
| 11,096,245 | B2 | 8/2021 | Kumar et al. |
| 2014/0220981 | A1 | 8/2014 | Jheng et al. |
| 2015/0282057 | A1* | 10/2015 | Li ......................... H04B 7/0871 |
| | | | 455/552.1 |
| 2016/0134316 | A1* | 5/2016 | Mohan ................. H04B 1/3816 |
| | | | 455/558 |
| 2017/0048773 | A1 | 2/2017 | Miao et al. |
| 2017/0223313 | A1 | 8/2017 | Chong et al. |
| 2018/0077728 | A1* | 3/2018 | Shi ......................... H04W 76/10 |
| 2019/0098596 | A1* | 3/2019 | Basu Mallick ....... H04W 88/06 |
| 2019/0342943 | A1* | 11/2019 | Rice ..................... H04B 1/0053 |
| 2020/0022207 | A1 | 1/2020 | Yu et al. |
| 2022/0117021 | A1 | 4/2022 | Chung et al. |

FOREIGN PATENT DOCUMENTS

| | | | | |
|---|---|---|---|---|
| KR | 10-2020-0073811 | A | 6/2020 | |
| KR | 10-2022-0009297 | A | 1/2022 | |
| WO | 2019/064068 | A1 | 4/2019 | |
| WO | 2019/213117 | A1 | 11/2019 | |
| WO | WO-2021257441 | A1 * | 12/2021 | .... H04W 36/008375 |
| WO | WO-2021258266 | A1 * | 12/2021 | ........... H04W 60/04 |

OTHER PUBLICATIONS

Korean Office Action dated Mar. 23, 2026, issued in a Korean Patent Application No. 10-2020-0124998.

* cited by examiner

ELECTRONIC DEVICE FOR SUPPORTING DUAL SIM AND CELLULAR COMMUNICATION CONVERTING METHOD OF ELECTRONIC DEVICE

CROSS-REFERENCE TO RELATED APPLICATION(S)

This application is a continuation application, claiming priority under § 365(c), of an International application No. PCT/KR2021/012525, filed on Sep. 14, 2021, which is based on and claims the benefit of a Korean patent application number 10-2020-0124998, filed on Sep. 25, 2020, in the Korean Intellectual Property Office, the disclosure of which is incorporated by reference herein in its entirety.

BACKGROUND

1. Field

The disclosure relates to an electronic device and a method of operating an electronic device. More particularly, the disclosure relates to a technology in which an electronic device configured to support a dual subscriber identification module (SIM) converts cellular communication.

2. Description of Related Art

In order to meet wireless data traffic demands that have increased after $4^{th}$ generation (4G) communication system commercialization, efforts to develop an improved $4^{th}$ generation (5G) communication system or a pre-5G communication system have been made. For this reason, the 5G communication system or the pre-5G communication system is called a beyond 4G network communication system or a post long term evolution (LTE) system. In order to achieve a high data transmission rate, an implementation of the 5G communication system in a millimeter wave (mm-Wave) band (for example, 60 gigahertz (GHz) band) is being considered. In the 5G communication system, technologies such as beamforming, massive multiple input/multiple output (MIMO), full dimensional MIMO (FD-MIMO), array antenna, analog beam-forming, and large scale antenna are being discussed.

The above information is presented as background information only to assist with an understanding of the disclosure. No determination has been made, and no assertion is made, as to whether any of the above might be applicable as prior art with regard to the disclosure.

SUMMARY

In case that an electronic device supports a dual SIM, at least two cellular networks may be connected thereto. In a state in which the electronic device is connected to one cellular network, in order to establish connection to another cellular network, an operation of assigning a radio frequency (RF) resource to a subscriber identity module corresponding to the cellular network to be connected may be needed. The electronic device may perform an operation of connecting another cellular network by using the assigned RF resource.

In order to secure reception of a message (e.g., a paging message) transmitted by an existing connected cellular network, the electronic device may assign an RF resource to a subscriber identity module corresponding to the existing connected cellular network after a specified time.

In case that an RF resource is assigned to the subscriber identity module corresponding to the existing connected cellular network while the electronic device performs connection with another cellular network, a situation in which data may not be transmitted to or received from another cellular network may occur. The electronic device may not perform an operation of connecting the cellular network to be connected until the RF resource is assigned to the cellular network to be connected and a time required to connect the cellular network to be connected may increase.

Aspects of the disclosure are to address at least the above-mentioned problems and/or disadvantages and to provide at least the advantages described below. Accordingly, an aspect of the disclosure is to provide an electronic device and method of operating an electronic device and to a technology in which an electronic device configured to support a dual subscriber identification module (SIM) converts cellular communication.

Additional aspects will be set forth in part in the description which follows and, in part, will be apparent from the description, or may be learned by practice of the presented embodiments.

In accordance with an aspect of the disclosure, an electronic device is provided. The electronic device includes a first subscriber identity module configured to store a first profile related to a first cellular network, a second subscriber identity module configured to store a second profile related to a second cellular network, a wireless communication circuit including an RF resource configured to perform data transmission or reception through one of the first cellular network and the second cellular network, and a communication processor, wherein the communication processor is configured to detect activation of a data transmission operation through the first cellular network in a state in which data transmission or reception is performed through the second cellular communication network, assign the RF resource to the first subscriber identity module during a first time, in response to the activation of the data transmission operation through the first cellular network, measure, through the RF resource, a quality of a channel corresponding to the first cellular network during the first time, further maintain a state in which the RF resource is assigned to the first subscriber identity module during a second time, in response to identifying that the measured quality satisfies a preconfigured condition, and reassign the RF resource to the second subscriber identity module after the second time expires.

In accordance with another aspect of the disclosure, an electronic device is provided. The electronic device includes a first subscriber identity module for storing a first profile related to a first cellular network, a second subscriber identity module configured to store a second profile related to a second cellular network, a wireless communication circuit including a first RF resource configured to perform data transmission through one of the first cellular network and the second cellular network, a second RF resource configured to perform data reception through the first cellular network, and a third RF resource configured to perform data reception through the second cellular network, and a communication processor, wherein the communication processor is configured to detect activation of a data transmission operation through the first cellular network in a state in which data transmission or reception is performed through the second cellular communication network, assign the first RF resource to the first subscriber identity module during a first time, in response to the activation of the data transmission operation through the first cellular network, measure, through the first RF resource and/or the second RF resource, a quality of a channel corresponding to the first cellular network during the first time, further maintain a state in which the first RF resource is assigned to the first subscriber identity module during a second time, in response to identifying that the measured quality satisfies a preconfigured condition, and assign the first RF resource to the second subscriber identity module again after the second time expires, and the communication processor is configured to assign the first RF resource to the second identity module in response to reception of a call connection message from the second cellular network while a quality of a channel corresponding to the first cellular network is measured.

In accordance with another aspect of the disclosure, a method of operating an electronic device is provided. The method includes an operation of detecting activation of a data transmission operation through a first cellular network in a state in which data transmission or reception is performed through a second cellular communication network, an operation of assigning an RF resource to a first subscriber identity module corresponding to the first cellular network during a first time in response to the activation of the data transmission operation through the first cellular network, an operation of measuring a quality of a channel corresponding to the first cellular network during the first time through the RF resource, an operation of further maintaining a state in which the RF resource is assigned to the first subscriber identity module during a second time in response to identifying that the measured quality satisfies a preconfigured condition, and an operation of assigning the RF resource to the second subscriber identity module corresponding to the second cellular network again after the second time expires.

An electronic device and a method according to various embodiments of the disclosure may measure a quality of a signal output by a base station in a state in which an RF resource is assigned to a cellular network and maintain a state in which an RF resource is assigned to a cellular network to be connected in case that the measured quality satisfies a designated condition. Therefore, the electronic device and the method of an electronic device may prevent the state in which the RF resource is assigned to a previously connected cellular network and increase cellular network conversion speed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a block diagram of an electronic device according to an embodiment of the disclosure;

FIG. 3 is a diagram illustrating a protocol stack structure of a legacy communication and/or 5G communication network according to an embodiment of the disclosure;

Throughout the drawings, it should be noted that like reference numbers are used to depict the same or similar elements, features, and structures.

DETAILED DESCRIPTION

Figure 2:
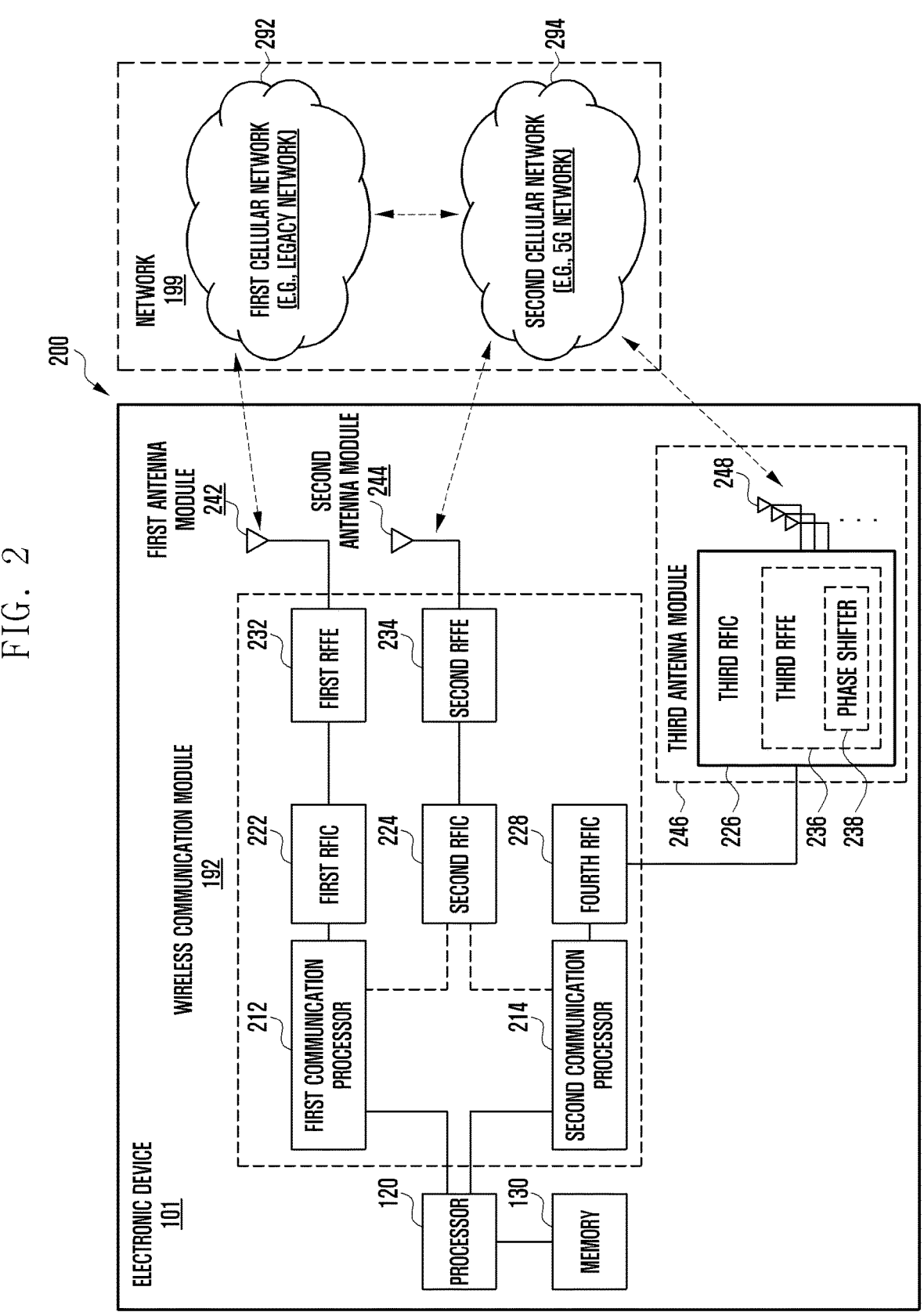
FIG. 2 is a block diagram illustrating an electronic device configured to support legacy network communication and 5G network communication according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
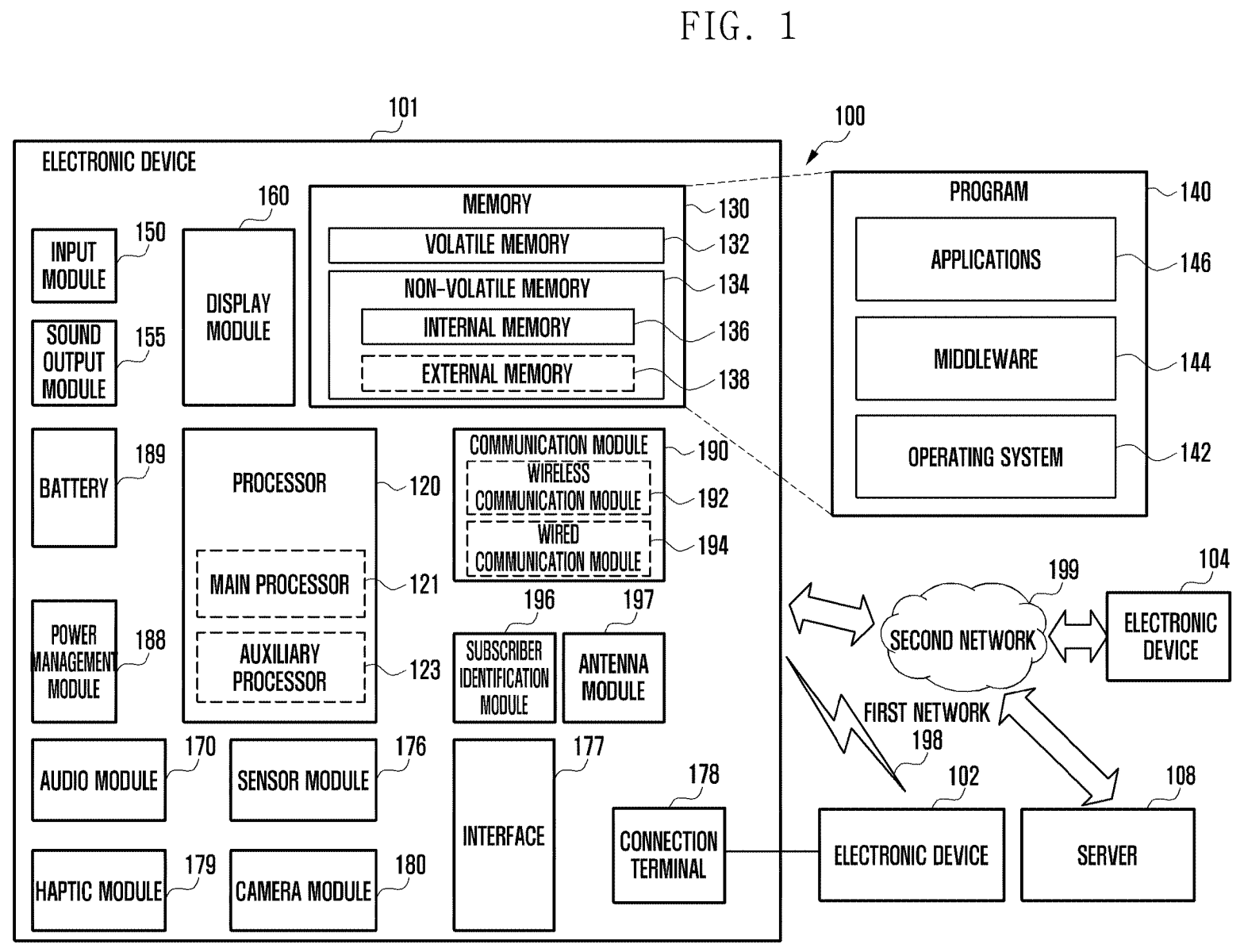

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module

176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., an international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is a block diagram 200 of an electronic device 101 for supporting legacy network communication and 5G network communication according to an embodiment of the disclosure. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. According to another embodiment of the disclosure, the electronic device 101 may further include at least one component among the components illustrated in FIG. 1, and the network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may be included as at least a part of the wireless communication module 192. According to another embodiment of the disclosure, the fourth RFIC 228 may be omitted or may be included as a part of the third RFIC 226.

The first communication processor 212 may establish a communication channel of a band to be used for wireless communication with the first network 292, and may support legacy network communication via the established communication channel. According to certain embodiments of the disclosure, the first network may be a legacy network including 2G, 3G, 4G, or long term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established channel. According to certain embodiments of the disclosure, the second network 294 may be a 5G network defined in 3GPP. Additionally, according to an embodiment of the disclosure, the first communication processor 212 or the second communication processor 214 may establish a communication channel corresponding to another designated band (e.g., lower than 6 GHZ) among bands to be used for wireless communication with the second network 294, and may support 5G network communication via the established channel. According to an embodiment of the disclosure, the first communication processor 212 and the second communication processor 214 may be implemented in a single chip or a single package. According to certain embodiments of the disclosure, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHZ) used for the second network 294 (e.g., 5G network). In the case of reception, a 5G Sub6 RF signal is obtained from the second network 294 (e.g., a 5G network) via an antenna (e.g., the second antenna module 244), and may preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second network 294 (e.g., 5G network). In the case of reception, a 5G Above6 RF signal is obtained from the second network 294 (e.g., a 5G network) via an antenna (e.g., the antenna 248), and may be preprocessed by a third RFFE 236. The third RFIC 226 may convert the preprocessed 5G Above6 RF signal to a baseband signal so that the base band signal is processed by the second communication processor 214. According to an embodiment of the disclosure, the third RFFE 236 may be implemented as a part of the third RFIC 226.

According to an embodiment of the disclosure, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an intermediate frequency (IF) signal) in an intermediate frequency band (e.g., approximately 9 GHz to 11 GHz), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFFE 236. The fourth RFIC 228 may convert the IF signal to a baseband signal so that the base band signal is processed by the second communication processor 214.

According to an embodiment of the disclosure, the first RFIC 222 and the second RFIC 224 may be implemented as a single chip or at least a part of the single package. According to an embodiment of the disclosure, the first RFFE 232 and the second RFFE 234 may be implemented as a single chip or at least a part of the single package. According to an embodiment of the disclosure, at least one antenna module of the first antenna module 242 or the second antenna module 244 may be omitted, or may be combined with another antenna module so as to process RF signals in a plurality of bands.

According to an embodiment of the disclosure, the third RFIC 226 and the antenna 248 may be disposed in the same substrate, and may form a third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second network 294 (e.g., 5G network).

According to an embodiment of the disclosure, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second network 294 (e.g., 5G network) may operate independently (e.g., stand-along (SA)) from the first network 292 (e.g., a legacy network), or may operate by being connected thereto (e.g., non-stand alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 230, and may be accessed by another component (e.g., the processor 120, the first communication processor 212, or the second communication processor 214).

Figure 3:
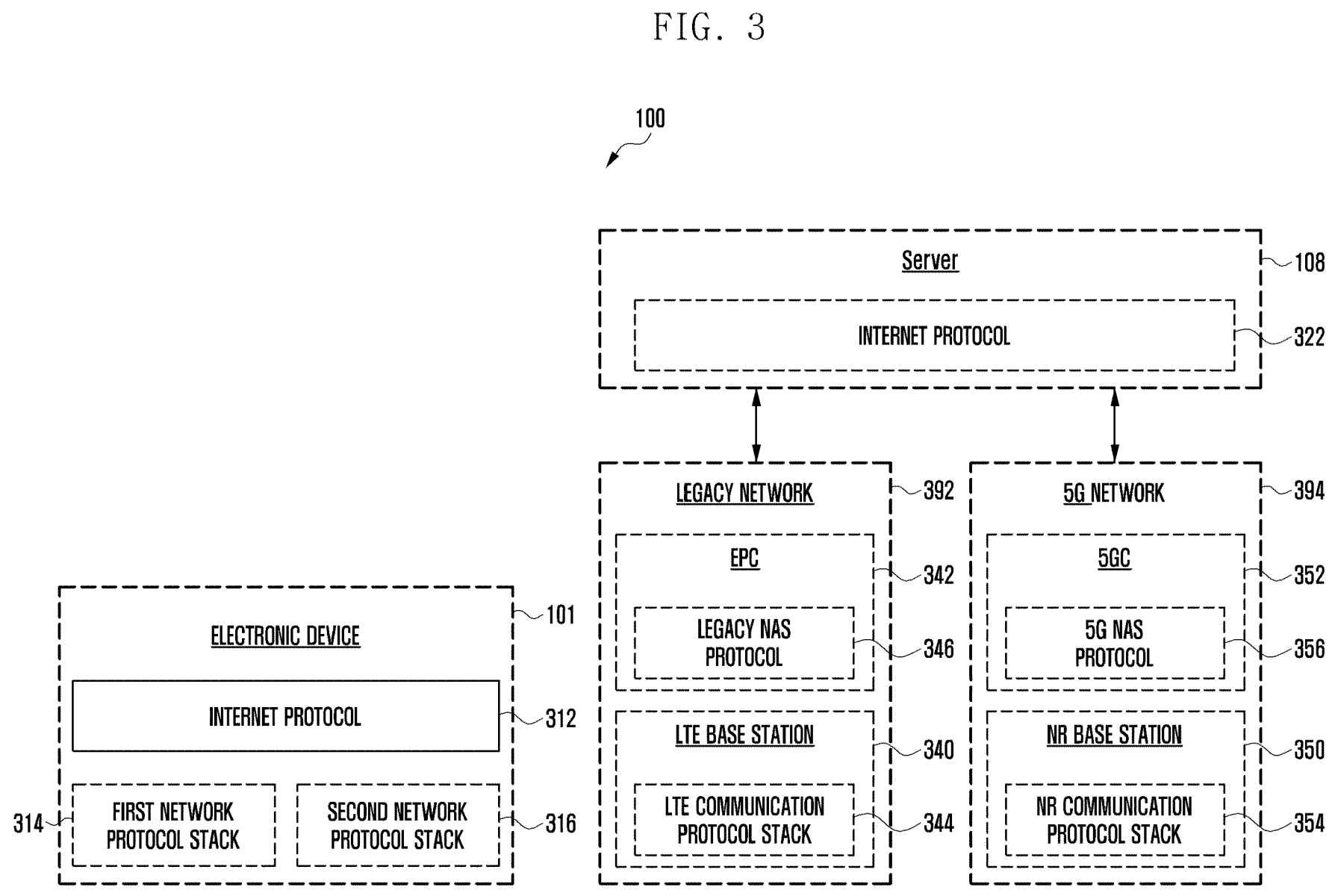

FIG. 3 illustrates a protocol stack structure of the network 100 of legacy communication and/or 5G communication according to an embodiment of the disclosure.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment of the disclosure, the electronic device 101 may perform Internet communication associated with the server 108 through the Internet protocol 312 (for example, a transmission control protocol (TCP), a user datagram protocol (UDP), or an internet protocol (IP)). The Internet protocol 312 may be executed by, for example, a main processor (for example, the main processor 121 of FIG. 1) included in the electronic device 101.

According to another embodiment of the disclosure, the electronic device 101 may perform wireless communication with the legacy network 392 through the first communication protocol stack 314. According to another embodiment of the disclosure, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment of the disclosure, the server 108 may include a cloud computing server existing outside the legacy network 392 or the 5G network 394. According to another embodiment of the disclosure, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment of the disclosure, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment of the disclosure, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARQ) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments of the disclosure, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4A:
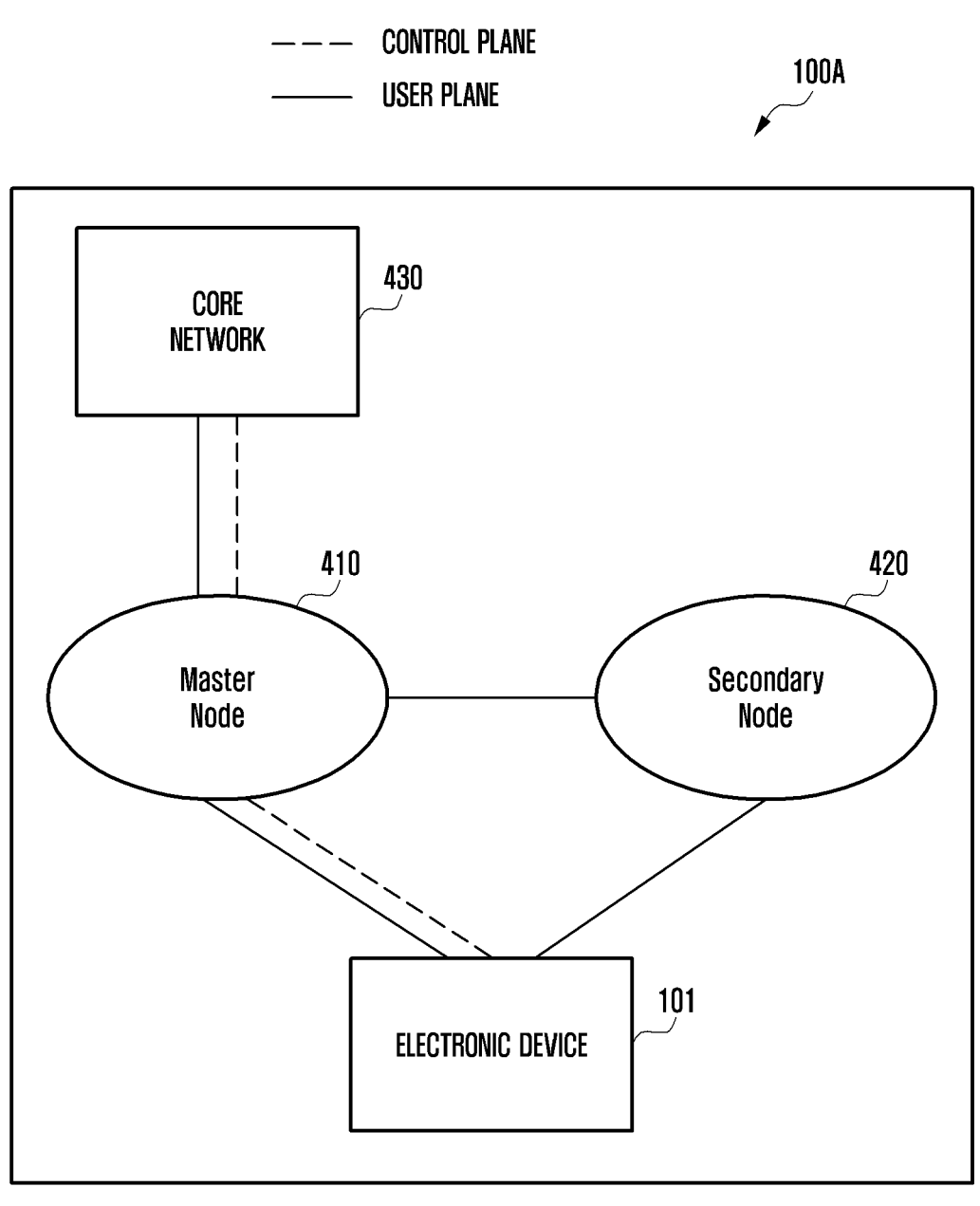
FIGS. 4A, 4B, and 4C are diagrams illustrating wireless communication systems providing networks of legacy communication and/or 5G communication according to various embodiments of the disclosure.
Figure 4B:
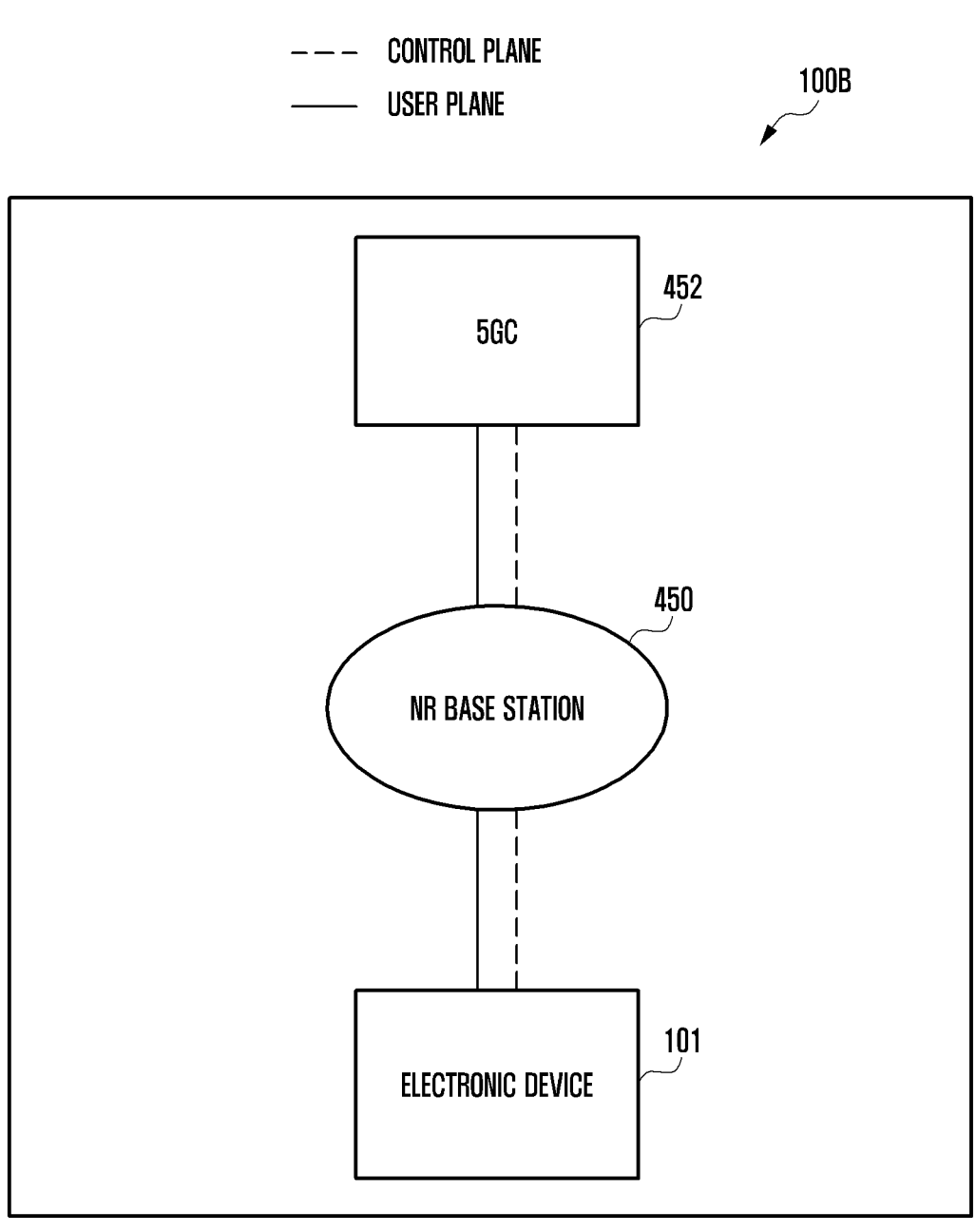
Figure 4C:
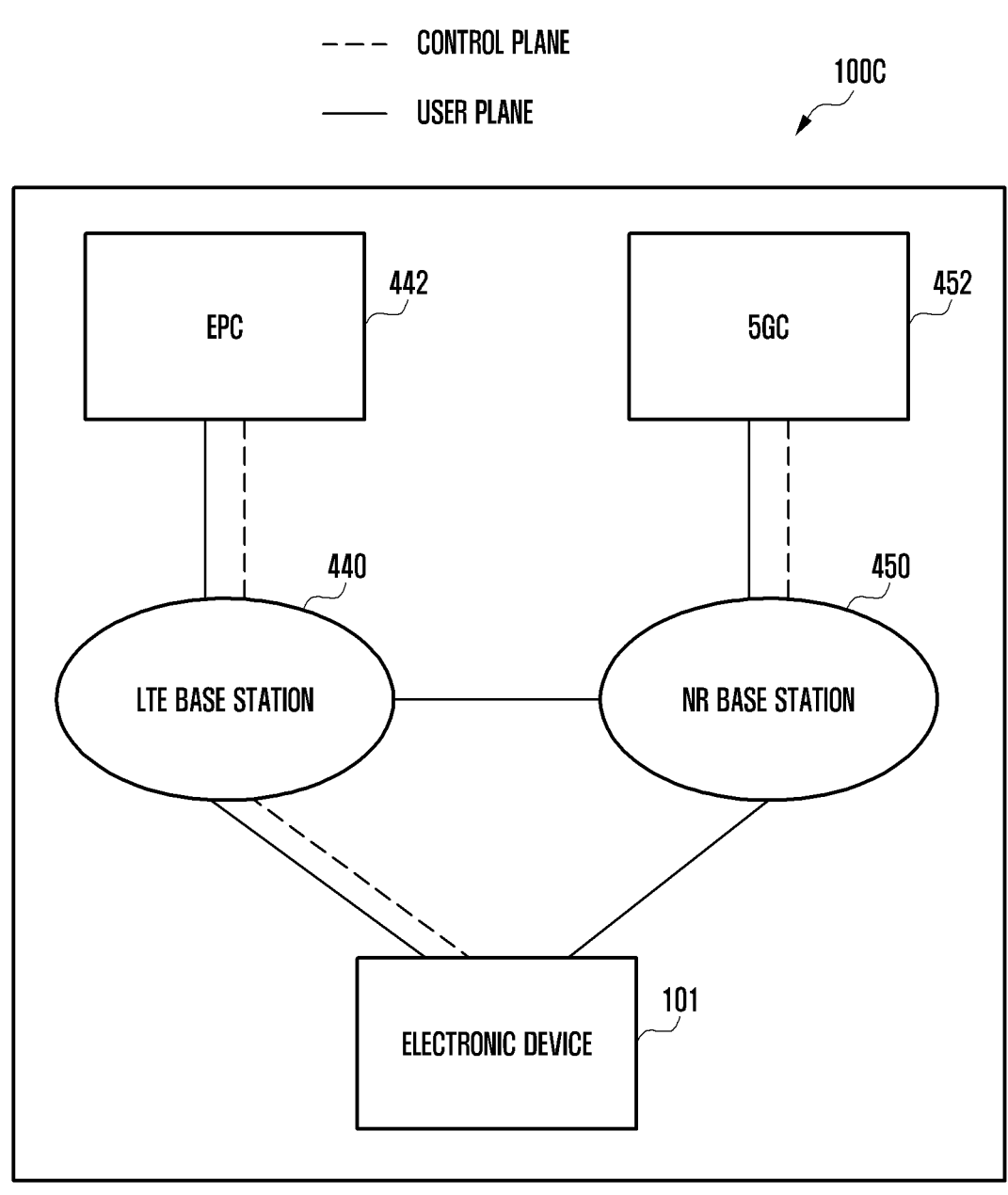

FIG. 4A illustrates a wireless communication system providing a network of legacy communication and/or 5G communication according to certain embodiments of the disclosure, FIG. 4B illustrates a wireless communication system providing a network of legacy communication and/or 5G communication according to certain embodiments of the disclosure, and FIG. 4C illustrates a wireless communication system providing a network of legacy communication and/or 5G communication according to certain embodiments of the disclosure.

Referring to FIGS. 4A to 4C, network environments 100A to 100C may include at least one of a legacy network and a 5G network. The legacy network may include, for example, a 4G or LTE eNB 450 (for example, an eNodeB (eNB)) of the 3GPP standard supporting radio access with the electronic device 101 and an evolved packet core (EPC) 451 for managing 4G communication. The 5G network may include, for example, a new radio (NR) gNB 450 (for example, a gNodeB (gNB)) supporting radio access with the electronic device 101 and a 5th generation core (5GC) 452 for managing 5G communication of the electronic device 101.

According to certain embodiments of the disclosure, the electronic device 101 may transmit and receive a control message and user data through legacy communication and/or 5G communication. The control message may include, for example, a control message related to at least one of security control of the electronic device 101, bearer setup, authentication, registration, or mobility management. The user data may be, for example, user data other than a control message transmitted and received between the electronic device 101 and a core network 430 (for example, an EPC 442).

Referring to FIG. 4A, the electronic device 101 according to an embodiment of the disclosure may transmit and receive at least one of a control message or user data to and from at least some of the 5G network (for example, the NR gNB 450 and the 5GC 452) using at least some of the legacy network (for example, the LTE eNB 440 and the EPC 442).

According to certain embodiments of the disclosure, the network environment 100A may include a network environment for providing wireless communication dual connectivity (multi-radio access technology (RAT) dual connectivity (MR-DC)) to the LTE eNB 440 and the NR gNB 450 and transmitting and receiving a control message to and from the electronic device 101 through one core network 430 of the EPC 442 or the 5GC 452.

According to certain embodiments of the disclosure, one of the MR-DC environment, the LTE eNB 440 or the NR gNB 450 may operate as a master node (MN) 410, and the other may operate as a secondary node (SN) 420. The MN 410 may be connected to the core network 430 and transmit and receive a control message. The MN 410 and the SN 420 may be connected to each other through a network interface and transmit and receive a message related to radio resource (for example, communication channel) management.

According to certain embodiments of the disclosure, the MN 410 may include the LTE eNB 450, the SN 420 may include the NR gNB 450, and the core network 430 may include the EPC 442. For example, a control message may be transmitted and received through the LTE eNB 440 and the EPC 442, and user data may be transmitted and received through the LTE eNB 450 and the NR gNB 450.

Referring to FIG. 4B, according to certain embodiments of the disclosure, the 5G network may independently transmit and receive a control message and user data to and from the electronic device 101.

Referring to FIG. 4C, the legacy network and the 5G network according to certain embodiments may independently provide data transmission and reception. For example, the electronic device 101 and the EPC 442 may transmit and receive a control message and user data through the LTE eNB 450. According to another embodiment of the disclosure, the electronic device 101 and the 5GC 452 may transmit and receive a control message and user data through the NR gNB 450.

According to certain embodiments of the disclosure, the electronic device 101 may be registered in at least one of the EPC 442 or the 5GC 450 and transmit and receive a control message.

According to certain embodiments of the disclosure, the EPC 442 or the 5GC 452 may interwork and manage communication of the electronic device 101. For example, movement information of the electronic device 101 may be transmitted and received through an interface between the EPC 442 and the 5GC 452.

Figure 5:
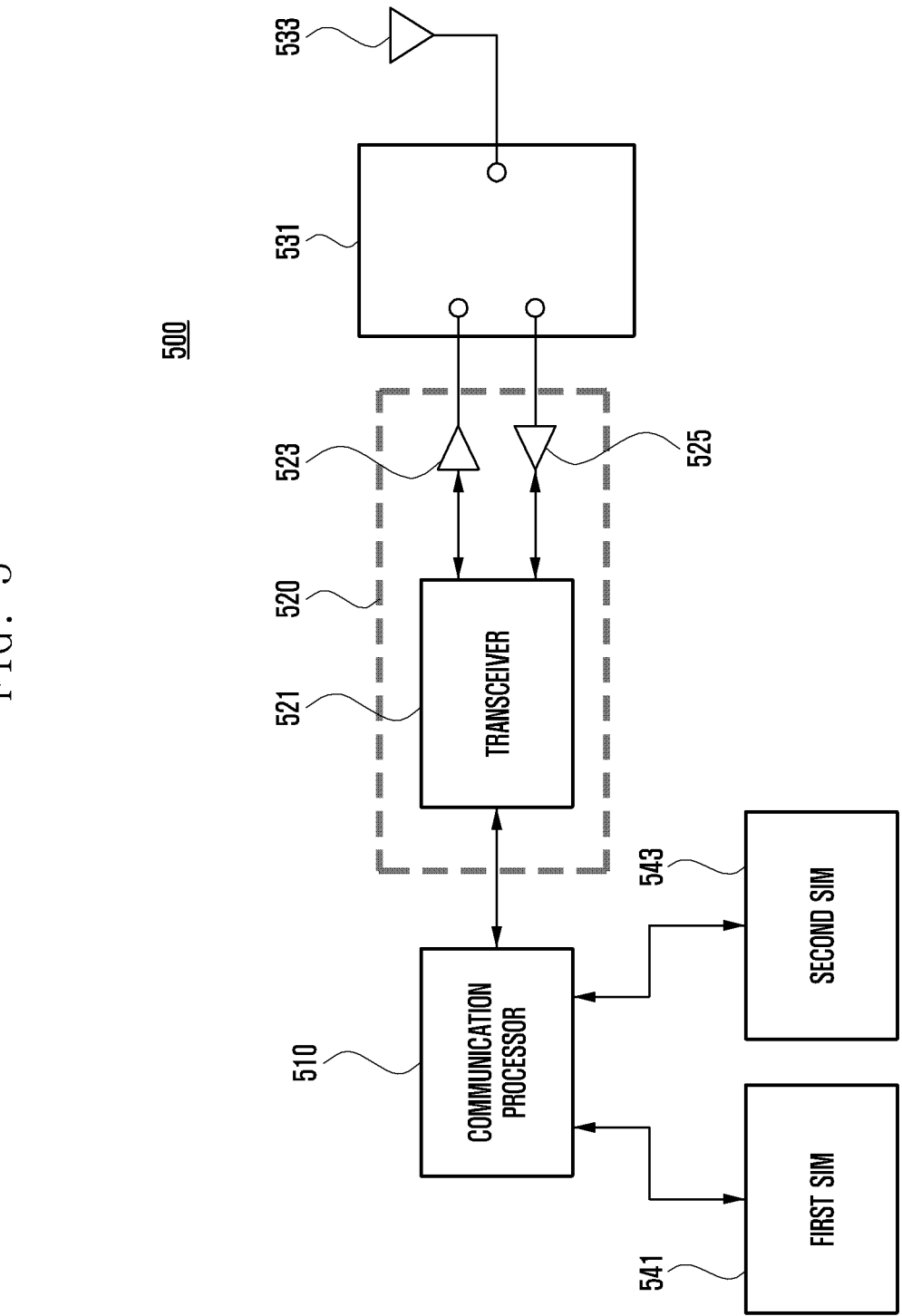
FIG. 5 is a block diagram of an electronic device according to an embodiment of the disclosure of the disclosure.

FIG. 5 is a block diagram of an electronic device according to an embodiment of the disclosure.

Referring to FIG. 5, the electronic device (e.g., the electronic device 101 in FIG. 1) 500 according to various embodiments of the disclosure may include a communication processor 510, a wireless communication circuit 520, a switch 531, an antenna 533, a first subscriber identity module (SIM) 541, and/or a second subscriber identity module 543.

According to various embodiments of the disclosure, the communication processor 510 may perform various operations for wireless communication on a cellular network. For example, the communication processor 510 may support establishment of a communication channel in a band to be used for wireless communication with a cellular network and wireless communication through the established communication channel.

According to various embodiments of the disclosure, based on control of the communication processor 510, the wireless communication circuit 520 may receive a signal radiated from the outside through the antenna 533 or radiate a signal transmitted by the communication processor 510 through the antenna 533. The wireless communication circuit 520 may include a transceiver 521 and an RF resource (not shown) for processing a signal. The RF resource may include an amplifier 523 for amplifying and transmitting a signal transmitted by the transceiver 521 to the antenna 533 and a low-noise amplifier (LNA) 525 for amplifying a signal received through the antenna 533 and transmitting an amplified signal to the transceiver 521.

According to various embodiments of the disclosure, transceiver 521 may perform various operations of processing a signal received from the communication processor 510. For example, the transceiver 521 may perform a modulation operation with respect to a signal received from the communication processor 521. For example, the transceiver 521 may perform a frequency modulation operation for converting a baseband signal into a radio frequency (RF) signal used for cellular communication. The transceiver 521 may perform a demodulation operation with respect to a signal received from the outside through the antenna 533. For example, the transceiver 521 may perform a frequency demodulation operation by converting a radio frequency (RF) signal into a baseband signal.

According to various embodiments of the disclosure, based on control of the communication processor 510, the switch 531 may perform connection between the antenna 533 and one of a resource (e.g., the amplifier 523) related to signal transmission and a resource (e.g., the low-noise amplifier 525) related to signal reception among RF resources.

According to various embodiments of the disclosure, the subscriber identity module (SIM) 541 or 543 may store identification information (e.g., an international mobile subscriber identity (IMSI)) for access, authentication, billing, security, and the like in a cellular network. The electronic device 500 may identify identification information stored in the first subscriber identity module 541 and/or the second subscriber identity module 543 during an access procedure (e.g., a registration procedure) to a cellular network and transmit the same to the base station.

According to various embodiments of the disclosure, the subscriber identity module 541 or 543 may be formed of an IC card and mounted on a slot provided in the electronic device 500. According to another embodiment of the disclosure, at least one of the subscriber identity modules 541 and 543 may be implemented in an embedded-SIM (or an embedded universal integrated circuit card (eUICC)) directly embedded in the electronic device 500. In case that the subscriber identity modules 541 or 543 is implemented in an embedded-SIM, in a manufacturing procedure, a security chip for storing the subscriber identity modules 541 or 543 is soldered on a circuit board of the electronic device 500 and then the subscriber identity modules 541 or 543 is mounted to a user terminal through remote SIM provisioning.

According to various embodiments of the disclosure, the electronic device 500 may include at least two subscriber identity modules. The disclosure illustrates an embodiment in which the electronic device 500 includes two subscriber identity modules (e.g., the first subscriber identity module 541 and the second subscriber identity module 543), but is not limited thereto.

According to various embodiments of the disclosure, the electronic device 500 may perform wireless communication with a first cellular network and a second cellular network operated by different service providers (or mobile carriers) by using the first subscriber identity module 541 and the second subscriber identity module 543. For example, the communication processor 510 may establish wireless access to a base station of the first cellular network by using first identity information stored in the first subscriber identity module 541 when accessing to the first cellular network and establish wireless access to a base station of the second cellular network by using second identity information stored in the second subscriber identity module 543 when accessing to the second cellular network when accessing to the first cellular network.

According to various embodiments of the disclosure, the first cellular network and/or the second cellular network may be one of various mobile communication networks. According to an embodiment of the disclosure, the first cellular network and the second cellular network may be either a 4th generation mobile communication network (LTE) or a 5th generation cellular communication network (new radio, NR). According to another embodiment of the disclosure, the first cellular network may be a network supporting EUTRA-NR-Dual-Connectivity (EN-DC). The EUTRA-NR-Dual-Connectivity (EN-DC) or a non-standalone (NSA) system may provide uplink and/or downlink transmission by using two radio access technologies (RATs). The electronic device 500 connected to the first cellular network supporting the EN-DC may concurrently use resources of the 4G LTE cellular network and the 5G NR cellular network.

According to various embodiments of the disclosure, the communication processor 510 may concurrently access to the first cellular network and the second cellular network or stand by using the first subscriber identity module 541 and the second subscriber identity module 543. The communication processor 510 may perform data communication by using one of the first cellular network and the second cellular network for data transmission or reception. Here, the communication processor 510 may perform data communication through one network and may not perform data communication through the other cellular network (or may stand by for data reception through the other cellular network). The electronic device may be connected to a cellular network not used for performing data communication at preconfigured intervals for paging message transmission or reception.

For example, in case that data communication is performed through the first cellular network, the communication processor 510 may assign the RF resource (e.g., the transceiver 521, the amplifier 523, and/or the low-noise amplifier 525) included in the wireless communication circuit 520 to the first subscriber identity module 541 (or the first cellular network). The communication processor 510 may perform data communication through the RF resource assigned to the first subscriber identity module 541. In this case, the RF resource is not assigned to the second subscriber identity module 543 and the communication processor 510 may not perform data communication through the second cellular network. The communication processor 510 may assign the RF resource to the second subscriber identity module 543 at every designated intervals. In a state in which the RF resource is assigned to the second subscriber identity module 543, the communication processor 510 may receive data (e.g., a paging message) transmitted by the second cellular network. The communication processor 510 may assign the RF resource to the first subscriber identity module 541 again in response to expiration of the designated interval and perform data communication through the first cellular network.

For another example, in case that data communication is performed through the second cellular network, the communication processor 510 may assign the RF resource (e.g., the transceiver 521, the amplifier 523, and/or the low-noise amplifier 525) included in the wireless communication circuit 520 to the second subscriber identity module 543 (or the second cellular network). The communication processor 510 may perform data communication through the RF resource assigned to the second subscriber identity module 543. In this case, the RF resource is not assigned to the first subscriber identity module 541 and the communication processor 510 may not perform data communication through the first cellular network. The communication processor 510 may assign the RF resource to the first subscriber identity module 541 at every designated intervals. In a state in which the RF resource is assigned to the first subscriber identity module 541, the communication processor 510 may receive data (e.g., a paging message) transmitted by the first cellular network. The communication processor 510 may assign the RF resource to the second subscriber identity module 543 again in response to expiration of the designated interval and perform data communication through the second cellular network.

According to various embodiments of the disclosure, a subscriber identity module to be used for data communication may be changed in the electronic device 500. For example, in a state in which data communication is performed by using the second subscriber identity module 543, the communication processor 510 may detect an operation of triggering data communication through the first cellular network. For example, in a state in which Internet data communication with the second cellular network is performed, the electronic device 500 may detect a user input requesting connection with the first cellular network or execution of an application performing cellular communication provided by the first cellular network.

According to various embodiments of the disclosure, in a state in which the second cellular network is connected, the communication processor 510 may assign the RF resource to the first subscriber identity module (e.g., the first cellular network) in response to detection of activation of data transmission through the first cellular network. The communication processor 510 may perform a connection procedure with a first base station (e.g., a base station supporting 4G mobile communication or a base station supporting an NSA mode of 5G mobile communication in case that the first cellular network supports the EN-DC) of the first cellular network through the RF resource.

According to various embodiments of the disclosure, the communication processor 510 may perform a connection procedure with the second base station after connection to the first base station. In case that the second base station is a base station (e.g., a base station supporting NR in the EN-DC) supporting dual connectivity, the communication processor 510 may perform an operation for connection to both the first base station and the second base station. In case that the first base station is a base station supporting non-standalone (NSA) and the second base station is a base station supporting standalone (SA), the communication processor 510 may complete connection with the second base station and then release connection with the first base station.

According to various embodiments of the disclosure, in order to ensure reception of a message (e.g., a paging message) transmitted by the second cellular network, the communication processor 510 may assign the RF resource to the second subscriber identity module 543 after a first time (e.g., Sub-2 allocation time). The communication processor 510 may identify whether the first time is expired through a timer (e.g., Sub-2 allocation timer) for identifying whether the first time is expired and assign the RF resource to the second subscriber identity module 543 in response to identifying that the first time is expired. The first time may be a preconfigured time.

According to various embodiments of the disclosure, the communication processor 510 may receive RRC configuration information from the first base station as a part of an operation to establish connection with the first cellular network. The RRC configuration information may include information on a condition for transmitting a measurement result of a quality of a signal transmitted by the second base station to the second base station (e.g., a base station supporting 5G mobile communication or a base station supporting a SA mode of 5G mobile communication in case that the first cellular network supports the EN-DC). For example, the information on a condition for transmitting a measurement result of a quality of a signal transmitted by the second base station may correspond to information related to a quality measurement request event (B1 event) for a signal (e.g., a reference signal) transmitted by the second base station and may include a designated value (B1 threshold) related to a quality of a signal transmitted by the second base station and/or a second time (time to trigger, TTT) during which a signal transmitted by the second base station is maintained.

According to various embodiments of the disclosure, the communication processor 510 may perform measurement of a quality of a signal transmitted by the second base station as a part of an operation to establish connection with the first cellular network in a state of being connected to the first base station. In response to identifying that a quality of a signal transmitted by the second base station has a value better than or equal to a designated value (B1 threshold) for a designated time (TTT), the communication processor 510 may release connection with the first base station by transmitting a measurement result to the first base station or perform connection with the second base station while maintaining connection with the first base station. According to an embodiment of the disclosure, in response to identifying that a signal transmitted by the second base station is greater than or equal to a designated value (B1 threshold) for a designated time (TTT), the communication processor 510 may transmit a quality measurement result of a signal transmitted by the second base station to the first base station. The communication processor 510 may perform connection to the second base station in response to reception of a handover request signal transmitted by the first base station or a connection request signal of the second base station.

In case that the first time is expired while the communication processor 510 performs a series of operations of performing connection with the second base station, the RF resource may be assigned from the first subscriber identity module 541 to the second subscriber identity module 543. In case that the RF resource is assigned to the second subscriber identity module 543, until the RF resource is assigned to the first subscriber identity module 541, the communication processor 510 may not perform a series of operations of performing connection with the second base station and a phenomenon of increasing a time connected to the first cellular network may occur. Hereinafter, a detailed description for reducing a time connected to the first cellular network will be given.

According to various embodiments of the disclosure, the communication processor 510 may detect activation of a data transmission operation through the first cellular network in a state of performing data transmission through the second cellular network (or a state in which the RF resource is assigned to the second subscriber identity module 543). In response to activation of data transmission operation, the communication processor 510 may assign the RF resource to the first subscriber identity module 541 (or the first cellular network) during a first time.

According to various embodiments of the disclosure, the communication processor 510 may perform a connection procedure with the first base station through the RF resource. The communication processor 510 may receive, from the first base station, information related to a quality measurement request event (B1 event) for a signal transmitted by the second base station. The information related to a quality measurement request event may include a designated value (B1 threshold) related to a quality of a signal transmitted by the second base station and/or a second time (time to trigger, TTT) during which a quality of a signal transmitted by the second base station is maintained.

According to various embodiments of the disclosure, in case that the first cellular network supports non-standalone (NSA)-based 5G communication, the first base station may be a base station supporting LTE communication and the second base station may be a base station supporting NSA NR communication.

According to various embodiments of the disclosure, in case that the first cellular network supports standalone (SA)-based 5G cellular communication, the first base station may be a base station supporting LTE communication and the second base station may be a base station supporting SA NR communication.

According to various embodiments of the disclosure, the communication processor 510 may measure a quality of a signal transmitted by the second base station of the first cellular network during a first time through the RF resource. The communication processor 510 may identify a quality measurement result and identify whether the quality measurement result satisfies a designated condition. The designated condition may include a condition with respect to whether the quality of a signal is equal to or greater than (or exceeds) a designated value related to a signal quality. Alternatively, the communication processor 510 may identify whether the quality measurement result is greater than a designated value related to a signal quality by a predetermined value (e.g., hysteresis) or more.

According to various embodiments of the disclosure, in response to identifying that a signal transmitted by the second base station satisfies a designated condition (e.g., the quality of a channel provided by the second base station is greater than or equal to (or exceeds) a designated value), the communication processor 510 may maintain a state in which the RF is resource assigned to the first subscriber identity module 541 (or the first cellular network). An operation of maintaining a state in which the RF resource is assigned to the first subscriber identity module 541 may include an operation in which the communication processor 510 does not assign the RF resource to the second subscriber identity module 543 regardless of expiration of a first time.

According to various embodiments of the disclosure, the communication processor 510 may determine a maintenance time of a state in which the RF resource is assigned to the first subscriber identity module 541 based on a time required for performing connection between the second base station and the electronic device 500. According to an embodiment of the disclosure, the communication processor may configure a maintenance time of a state in which the RF resource is assigned to the first subscriber identity module 541 based on the second time (TTT). According to another embodiment of the disclosure, the communication processor 510 may determine a time required for performing connection between the second base station and the electronic device 500 based on a record of performing connection with the second base station.

According to various embodiments of the disclosure, the communication processor 510 may perform a connection procedure with the second base station while a state in which the RF resource is assigned to the first subscriber identity module 541 is maintained. The communication processor 510 may perform at least one operation for performing connection with the second base station, which includes a random access channel (RACH) corresponding to a procedure for initial access to a channel provided by the second base station and an access procedure through a channel provided by the second base station. In case that the second time is expired or the connection procedure with the second base station is completed (e.g., RRC reconfiguration complete message indicating that the connection procedure is completed is received from the second base station), the communication processor 510 may assign the RF resource to the second subscriber identity module 543.

According to various embodiments of the disclosure, in a state in which the RF resource is assigned to the second subscriber identity module 543, the communication processor 510 may perform a series of operations for reception of a message (e.g., a paging message) transmitted by the second cellular network. According to an embodiment of the disclosure, the communication processor 510 may perform a tracking area update (TAU) operation to allow the second cellular network to trace a position of the electronic device 500. Through the TAU operation, RRC connection between the electronic device 500 and the second cellular network may be released. The communication processor 510 may identify that a series of operations for receiving a message transmitted by the second cellular network are completed and assign the RF resource to the first subscriber identity module 541 again. The communication processor 510 may perform data communication through the first cellular network by using RF resource.

According to various embodiments of the disclosure, in response to identifying that the quality of a signal transmitted by the second base station does not satisfy a designated condition (e.g., the quality of a signal transmitted by the second base station has a value less than or equal to (or under) a designated value), the communication processor 510 may identify whether the first time is expired. In response to identifying that the first time is expired, the communication processor 510 may assign the RF resource to the second subscriber identity module 543 (or the second cellular network). In a state in which the RF resource is assigned to the second subscriber identity module 543, the communication processor 510 may perform a series of operations for reception of a message (e.g., a paging message) transmitted by the second cellular network. According to an embodiment of the disclosure, the communication processor 510 may perform a tracking area update (TAU)

operation to allow the second cellular network to trace a position of the electronic device 500. Through the TAU operation, RRC connection between the electronic device 500 and the second cellular network may be released. The communication processor 510 may identify that a series of operations for receiving a message transmitted by the second cellular network are completed and assign the RF resource to the first subscriber identity module 541 again. The communication processor 510 may perform data communication through the first cellular network by using RF resource.

In case that the quality of a signal transmitted by the second base station satisfies a designated condition, the electronic device 500 according to various embodiments of the disclosure may prevent the RF resource from being assigned to the second subscriber identity module 543 by maintaining a state in which the RF resource is assigned to the first subscriber identity module 541. Accordingly, assignment of the RF resource to the second subscriber identity module 543 may prevent possible delay of a connection operation to the second base station.

The embodiment described above may be applied to a case in which the data transmission operation through the first cellular network and the second cellular network uses the same RF resource. However, the disclosure may be also applied to a case in which the data transmission operation through the first cellular network and the second cellular network shares at least some of the same RF resources (e.g., RF resources used for receiving signals). An embodiment with respect to the case in which the data transmission operation through the first cellular network and the second cellular network shares at least some of the same RF resources (e.g., RF resources used for receiving signals) will be described with reference to FIG. 7 below.

Figure 6:
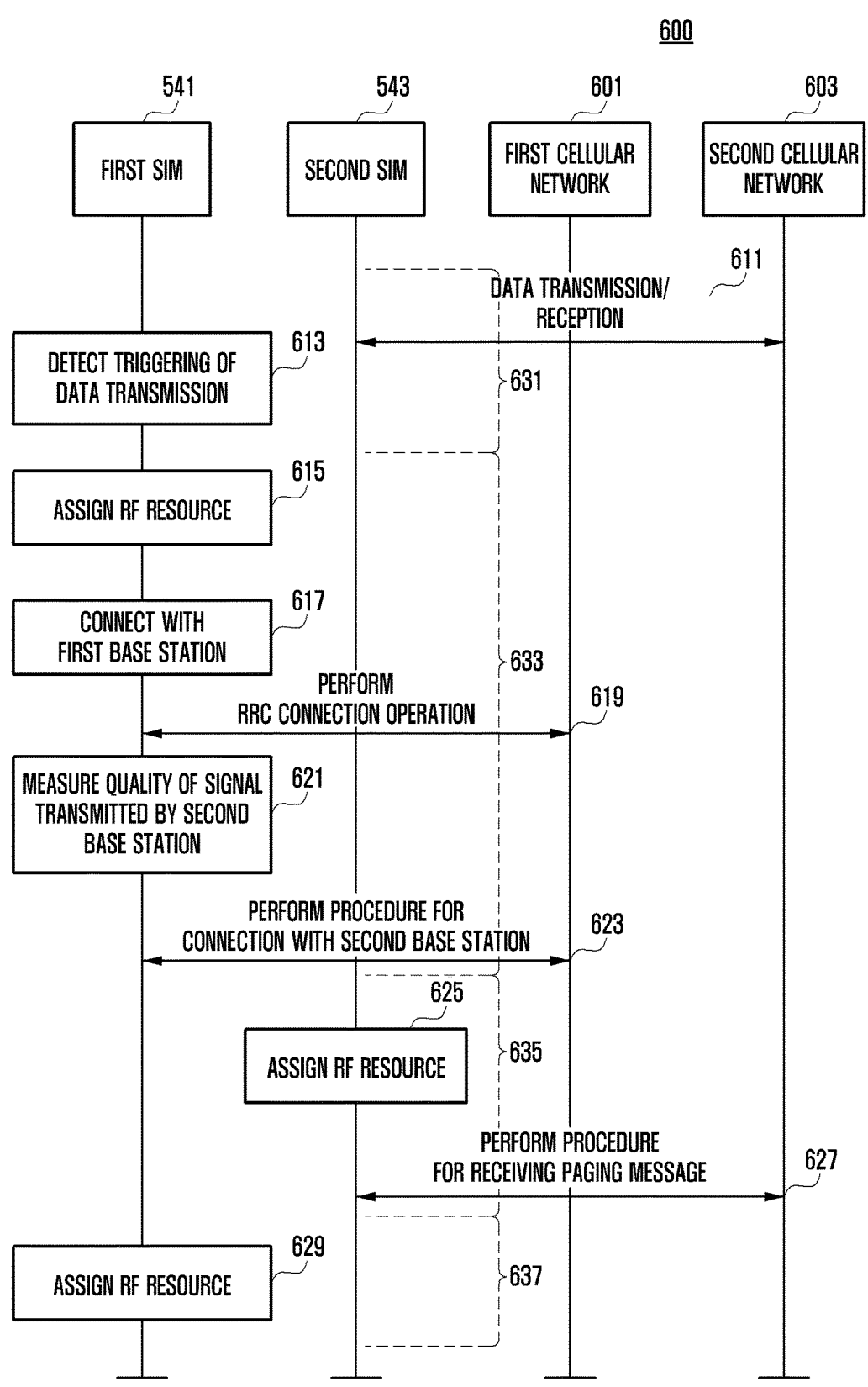
FIG. 6 is a signal flow diagram illustrating an embodiment in which an electronic device is connected to a first cellular network and a second cellular network according to an embodiment of the disclosure of the disclosure.

FIG. 6 is a signal flow diagram illustrating an operation 600 in which an electronic device is connected to a first cellular network and a second cellular network according to an embodiment of the disclosure.

Referring to FIG. 6, according to various embodiments of the disclosure, in operation 611, an electronic device (e.g., the electronic device 500 in FIG. 5) may perform data communication through a second cellular network 603.

According to various embodiments of the disclosure, the electronic device 500 may load a second profile stored in the second subscriber identity module 543 to the communication processor 510 and may be connected to the second cellular network 603 through the second profile. The electronic device 500 may perform connection through the second cellular network 603 and perform data communication through the second cellular network.

According to various embodiments of the disclosure, in operation 613, the electronic device 500 may detect triggering of data transmission through the first cellular network.

According to various embodiments of the disclosure, in a state in which data communication is performed by using the second subscriber identity module 543, the communication processor 510 may detect an operation of triggering data communication through the first cellular network. For example, in a state in which Internet data communication with the second cellular network 603 is performed, according to detection of a user input requesting connection with a first cellular network 601 or execution of an application performing cellular communication provided by the first cellular network, the electronic device 500 may detect triggering of data transmission through the first cellular network.

According to various embodiments of the disclosure, in operation 615, in a state in which the second cellular network 603 is connected, the electronic device 500 may assign the RF resource to the first subscriber identity module (e.g., the first cellular network) in response to detection of activation of data transmission through the first cellular network.

According to various embodiments of the disclosure, in order to receive a message (e.g., a paging message) transmitted by the second cellular network, the electronic device 500 may assign the RF resource to the second subscriber identity module 543 after a first time (e.g., Sub-2 allocation time). The electronic device 500 may identify whether the first time is expired through a timer (e.g., Sub-2 allocation timer) for identifying whether the first time is expired and assign the RF resource to the second subscriber identity module 543 in response to identifying that the first time is expired. The first time is a preconfigured time and may be received from the second cellular network.

According to various embodiments of the disclosure, in operation 617, the electronic device 500 may perform a connection procedure with a first base station (e.g., a base station supporting 4G mobile communication or a base station supporting an NSA mode of 5G mobile communication in case that the first cellular network 601 supports the EN-DC) of the first cellular network 601 through the RF resource.

According to various embodiments of the disclosure, in operation 619, the electronic device 500 may perform an operation of RRC connection with the first base station through the RF resource.

According to various embodiments of the disclosure, the electronic device 500 may receive RRC configuration information from the first base station as a part of an operation to establish connection with the first cellular network. The RRC configuration information may include information on a condition to transmit a measurement result of a quality of a signal transmitted to the second base station (e.g., a base station supporting 5G mobile communication or a base station supporting a SA mode of 5G mobile communication in case that the first cellular network 601 supports the EN-DC). For example, the information on a condition to transmit a measurement result of a quality of a signal to the second base station may correspond to information related to a signal strength and/or a quality measurement request event (B1 event) for a signal provided by the first base station with respect to the second base station and may include a signal strength and/or a designated value (B1 threshold) of the second base station, and/or a signal strength and/or a second time (time to trigger, TTT) which is a time for maintaining a quality.

According to various embodiments of the disclosure, in operation 621, the electronic device 500 may perform quality measurement of a signal transmitted by the second base station in a state of being connected to the first base station.

According to various embodiments of the disclosure, the electronic device 500 may measure a quality of a signal transmitted by the second base station of the first cellular network 601 during a first time through the RF resource. The electronic device 500 may identify a quality measurement result of a signal and identify whether the quality measurement result satisfies a designated condition. The designated condition may include a condition with respect to whether the quality of a signal is equal to or greater than (or exceeds) a designated value related to a signal quality. Alternatively, the electronic device 500 may identify whether the quality measurement result is greater than a designated value related to a channel quality by a predetermined size (e.g., hysteresis) or more to prevent frequent hand-overs.

According to various embodiments of the disclosure, in response to identifying that a quality of a signal transmitted by the second base station satisfies a designated condition (e.g., the quality of a channel provided by the second base station is greater than or equal to (or exceeds) a designated value), the electronic device 500 may maintain a state in which the RF resource is assigned to the first subscriber identity module 541 (or the first cellular network). An operation of maintaining a state in which the RF resource is assigned to the first subscriber identity module 541 may include an operation in which the communication processor 510 does not assign the RF resource to the second subscriber identity module 543 regardless of expiration of a first time.

According to various embodiments of the disclosure, in operation 619, based on receiving RRC configuration information including a signal strength and/or a second time (time to trigger, TTT) corresponding to a quality maintenance time of the second base station to perform a signal quality measurement operation of the second base station during performing an operation of RRC connection with the first base station through the RF resource, the electronic device 500 may configure by adding as much as a second time received during a first time which is configured for an operation of not assigning the RF resource to the second subscriber identity module 543.

According to various embodiments of the disclosure, the electronic device 500 may determine a maintenance time of a state in which the RF resource is assigned to the first subscriber identity module 541 based on a time required for performing connection between the second base station and the electronic device 500. According to an embodiment of the disclosure, the electronic device may configure a maintenance time of a state in which the RF resource is assigned to the first subscriber identity module 541 as the second time (TTT). According to another embodiment of the disclosure, the electronic device 500 may determine a time required for performing connection between the second base station and the electronic device 500 based on a record of performing connection with the second base station.

According to various embodiments of the disclosure, in operation 623, the electronic device 500 may perform a procedure of connection with the second base station.

According to various embodiments of the disclosure, in response to identifying that a quality of a signal transmitted by the second base station is greater than or equal to a designated value (B1 threshold) for a designated time (e.g., TTT), the communication processor 510 may transmit a quality measurement result of a signal transmitted by the second base station to the first base station. The communication processor 510 may receive a connection request of the second base station transmitted by the first base station and in response to reception of a connection request signal of the second base station, may perform connection to the second base station.

According to various embodiments of the disclosure, in case that the first cellular network 601 supports non-standalone (NSA)-based 5G cellular communication, the first base station may be a base station supporting LTE communication and the second base station may be a base station supporting non-standalone (NSA)-NR communication. Here, the communication processor 510 may perform connection with the second base station in a state of maintaining connection with the first base station.

According to various embodiments of the disclosure, in case that the first cellular network 601 supports standalone (SA)-based 5G cellular communication, the first base station may be a base station supporting LTE NSA-NR communication and the second base station may be a base station supporting SA-NR communication. In this case, the communication processor 510 may release connection with the first base station and perform connection with the second base station. According to various embodiments of the disclosure, the electronic device 500 may perform a connection procedure with the second base station while a state in which the RF resource is assigned to the first subscriber identity module 541 is maintained. The electronic device 500 may perform at least one operation for performing connection with the second base station, which includes a random access channel (RACH) corresponding to a procedure for initial access to a channel provided by the second base station and an access procedure through a channel provided by the second base station.

According to various embodiments of the disclosure, in operation 625, the electronic device 500 may assign the RF resource to the second subscriber identity module 543.

According to various embodiments of the disclosure, in case that the second time is expired or the connection procedure with the second base station is completed (e.g., RRC reconfiguration complete message indicating that the connection procedure is completed is received from the second base station), the electronic device 500 may assign the RF resource to the second subscriber identity module 543.

According to various embodiments of the disclosure, in operation 627, the electronic device 500 may perform a procedure for receiving a paging message through the second cellular network. After operation 627, the RF resource may be in a state 637 assigned to the second subscriber identity module 543.

According to an embodiment of the disclosure, the electronic device 500 may perform a tracking area update (TAU) operation to allow the second cellular network 603 to trace a position of the electronic device 500. Depending on the performance of the TAU operation, the electronic device 500 may be converted into an RRC idle state together with the second cellular network 603 in an RRC connected state. As converted into the RRC idle state with respect to the second cellular network, the electronic device 500 may receive a paging message transmitted by the second cellular network. According to an embodiment of the disclosure, the electronic device 500 may receive a paging message by assigning the RF resource to the second subscriber identity module 543 every first time.

According to various embodiments of the disclosure, in operation 629, the electronic device 500 may assign the RF resource to the first subscriber identity module 541 again.

According to various embodiments of the disclosure, the electronic device 500 may identify that a series of operations for receiving a paging message transmitted by the second cellular network 603 are completed and assign the RF resource to the first subscriber identity module 541 again. The electronic device 500 may perform data communication through the first cellular network 601 by using RF resource.

According to various embodiments of the disclosure, the data communication through the first cellular network 601 may include data communication through the second base station or data communication through the first base station and the second base station.

According to various embodiments of the disclosure, the RF resource may be in a state 631 assigned to the second subscriber identity module 543 before operation 615. After operation 615, the RF resource may be in a state 633 assigned to the first subscriber identity module 541 before operation 625. After operation 625, the RF resource may be in a state 635 assigned to the second subscriber identity module 543 before operation 629. In case that the quality of a signal transmitted by the second base station satisfies a designated condition, the electronic device 500 according to various embodiments of the disclosure may prevent the RF resource from being assigned to the second subscriber identity module 543 by maintaining a state in which the RF resource is assigned to the first subscriber identity module 541. Accordingly, assignment of the RF resource to the second subscriber identity module 543 may prevent possible delay of a connection operation to the second base station.

According to various embodiments of the disclosure, in response to identifying that the quality of a signal transmitted by the second base station does not satisfy a designated condition (e.g., the quality of a channel provided by the second base station is less than or equal to (or under) a designated value), the communication processor 510 may identify whether the first time is expired. In response to identifying that the first time is expired, the communication processor 510 may assign the RF resource to the second subscriber identity module 543 (or the second cellular network). In a state in which the RF resource is assigned to the second subscriber identity module 543, the electronic device 500 may perform a series of operations for reception of a message (e.g., a paging message) transmitted by the second cellular network. According to an embodiment of the disclosure, the communication processor 510 may perform a tracking area update (TAU) operation to allow the second cellular network 603 to trace a position of the electronic device 500. The electronic device 500 may identify that a series of operations for receiving a message transmitted by the second cellular network 603 are completed and assign the RF resource to the first subscriber identity module 541 again. The electronic device 500 may perform data communication through the first cellular network 601 by using RF resource. Here, the electronic device 500 may omit operation 623 and perform data communication through the first base station, not the second base station.

An electronic device according to various embodiments of the disclosure may include a first subscriber identity module for storing a first profile related to a first cellular network, a second subscriber identity module for storing a second profile related to a second cellular network, a wireless communication circuit including an RF resource for performing data transmission or reception through one of the first cellular network 601 and the second cellular network, and a communication processor, wherein the communication processor is configured to detect activation of a data transmission operation through the first cellular network, in a state in which data transmission or reception is performed through the second cellular communication network, assign the RF resource to the first subscriber identity module during a first time, in response to the activation of the data transmission operation through the first cellular network, measure, through the RF resource, the quality of a channel corresponding to the first cellular network 601 during the first time, further maintain a state in which the RF resource is assigned to the first subscriber identity module during a second time, in response to identifying that the measured quality satisfies a preconfigured condition, and assign the RF resource to the second subscriber identity module again after the second time expires.

In the electronic device according to various embodiments of the disclosure, the communication processor may be configured to perform at least one operation configured to perform connection with the first cellular network 601 while a state in which the RF resource is assigned to the first subscriber identity module is maintained during the second time.

In the electronic device according to various embodiments of the disclosure, the communication processor may be configured to assign the RF resource to the second subscriber identity module again in response to reception from the first cellular network 601 of a message indicating completion of connection with the first cellular network.

In the electronic device according to various embodiments of the disclosure, the communication processor may be configured to perform, through the RF resource, a procedure for configuring the RF resource to be assigned to the second subscriber identity module again and then a paging message to be received from the second cellular network.

In the electronic device according to various embodiments of the disclosure, the procedure for configuring the paging message to be received may include a tracking area update (TAU) procedure.

In the electronic device according to various embodiments of the disclosure, the communication processor may be configured to assign the RF resource to the first subscriber identity module again in response to completion of the procedure for configuring the paging message to be received.

In the electronic device according to various embodiments of the disclosure, the communication processor may be configured to assign the RF resource to the second subscriber identity module in response to identifying that the measured quality does not satisfy the preconfigured condition.

In the electronic device according to various embodiments of the disclosure, the communication processor may be configured to transmit a quality measurement result of a signal transmitted by the second base station of the second cellular network 603 to the first base station of the first cellular network, while maintaining a state in which the RF resource is assigned to the first subscriber identity module during the second time.

In the electronic device according to various embodiments of the disclosure, the second time may be included in information transmitted by the first cellular network.

In the electronic device according to various embodiments of the disclosure, the information transmitted by the first cellular network 601 may be included in an RRC reconfiguration message received through the first cellular network 601 during attempting a connection operation with the first cellular network 601 after assigning the RF resource to the first subscriber identity module in response to activation of a data transmission operation through the first cellular network.

In the electronic device according to various embodiments of the disclosure, the first cellular network 601 may correspond to 4G mobile communication network for supporting evolved universal mobile telecommunications system (UMTS) terrestrial radio access network (E-UTRA-NR)-Dual-Connectivity (EN-DC) or standalone (SA) and the second cellular network 603 may correspond to 5G mobile communication network for supporting EN-DC or SA.

An electronic device according to various embodiments of the disclosure may include a first subscriber identity module for storing a first profile related to a first cellular network, a second subscriber identity module configured to store a second profile related to a second cellular network, a wireless communication circuit including a first RF resource configured to perform data transmission through one of the first cellular network 601 and the second cellular network, a second RF resource configured to perform data reception through the first cellular network, and a third RF resource configured to perform data reception through the second cellular network, and a communication processor, wherein the communication processor is configured to detect activation of a data transmission operation through the first cellular network 601 in a state in which data transmission or reception is performed through the second cellular communication network, assign the first RF resource to the first subscriber identity module during a first time, in response to the activation of the data transmission operation through the first cellular network, measure, through the first RF resource and/or the second RF resource, the quality of a channel corresponding to the first cellular network 601 during the first time, further maintain a state in which the first RF resource is assigned to the first subscriber identity module during a second time, in response to identifying that the measured quality satisfies a preconfigured condition, and assign the first RF resource to the second subscriber identity module again after the second time expires, and the communication processor is configured to assign the first RF resource to the second identity module in response to reception of a call connection message from the second cellular network 603 while a quality of a channel corresponding to the first cellular network 601 is measured.

Figure 7:
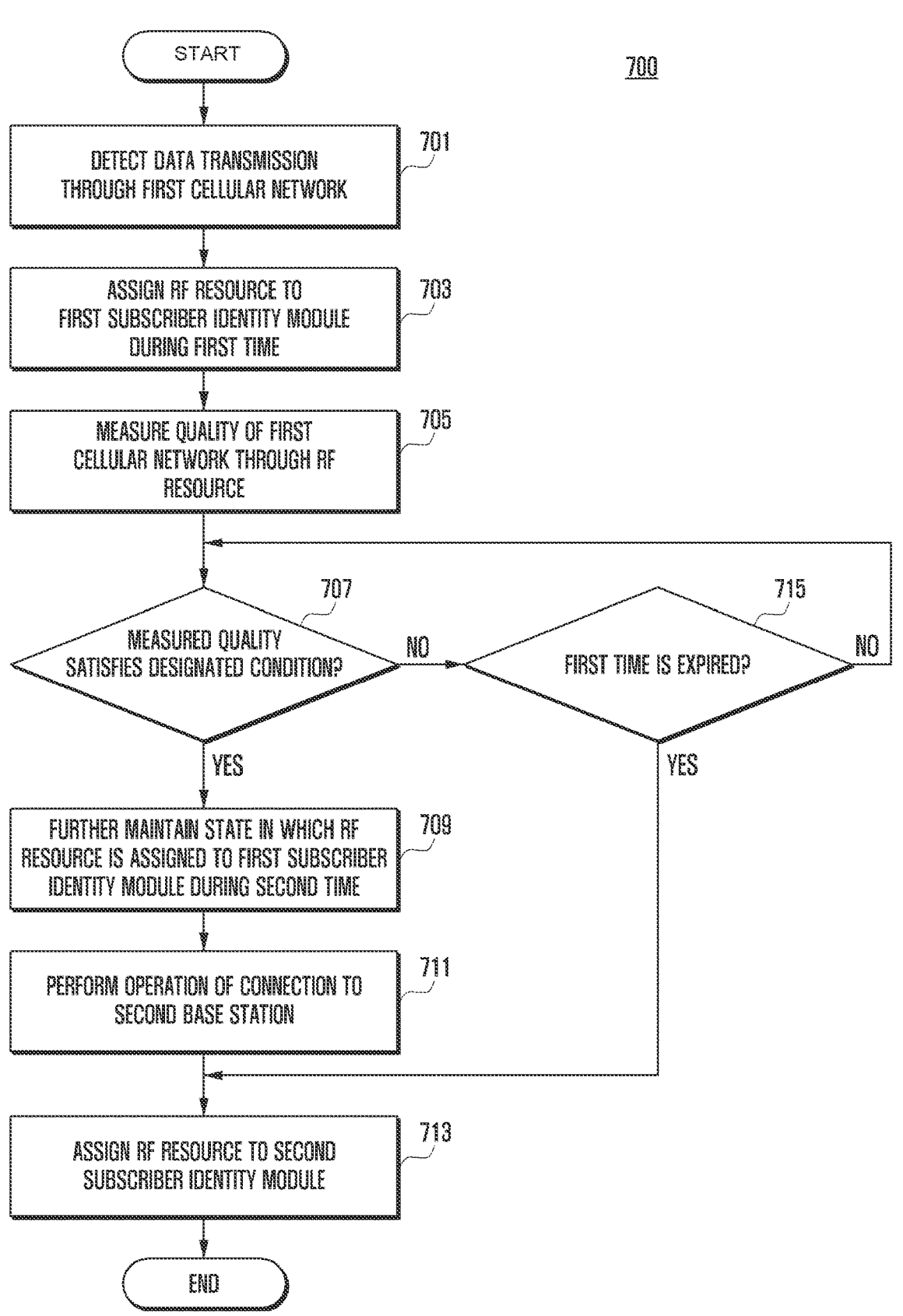
FIG. 7 is an operation flowchart illustrating a method of operating an electronic device according to an embodiment of the disclosure of the disclosure.

FIG. 7 is an operation flowchart illustrating an operation method 700 of an electronic device according to an embodiment of the disclosure.

Referring to FIG. 7, according to various embodiments of the disclosure, in operation 701, an electronic device (e.g., the electronic device 500 in FIG. 5) may detect data communication through a first cellular network in a state of performing data transmission or reception through a second cellular network.

For example, in a state in which Internet data communication with the second cellular network is performed, according to detection of a user input requesting connection with the first cellular network or execution of an application performing cellular communication provided by the first cellular network, the electronic device 500 may detect triggering of data transmission through the first cellular network.

According to various embodiments of the disclosure, an RF resource included in a wireless communication circuit (e.g., the wireless communication circuit 530 in FIG. 5) may be assigned to a second subscriber identity module (e.g., the second subscriber identity module 543 in FIG. 5).

According to various embodiments of the disclosure, in operation 703, the electronic device 500 may assign the RF resource to a first subscriber identity module (e.g., the first subscriber identity module 541 in FIG. 5) during a first time.

According to various embodiments of the disclosure, in order to receive a message (e.g., a paging message) transmitted by the second cellular network, the electronic device 500 may assign the RF resource to the second subscriber identity module 543 after a first time (e.g., Sub-2 allocation time). The electronic device 500 may identify whether the first time is expired through a timer (e.g., Sub-2 allocation timer) for identifying whether the first time is expired and assign the RF resource to the second subscriber identity module 543 in response to identifying that the first time is expired. The first time may be a preconfigured time.

According to various embodiments of the disclosure, the electronic device 500 may perform a connection procedure with a first base station (e.g., a base station supporting 4G mobile communication or a base station supporting an NSA mode of 5G mobile communication in case that the first cellular network supports the EN-DC) of the first cellular network through the RF resource.

According to various embodiments of the disclosure, the electronic device 500 may receive RRC configuration information from the first base station as a part of an operation to establish connection with the first cellular network. The RRC configuration information may include information on a condition for transmitting a measurement result of a quality of a signal transmitted by the second base station to the second base station (e.g., a base station supporting 5G mobile communication or a base station supporting a SA mode of 5G mobile communication in case that the first cellular network supports the EN-DC). For example, the information on a condition for transmitting a measurement result of a quality of a signal transmitted by the second base station to the second base station may correspond to information related to a quality measurement request event (B1 event) for a signal transmitted by the second base station and may include a designated value (B1 threshold) related to a quality of a signal transmitted by the second base station and/or a second time (time to trigger, TTT) during which a quality of a signal transmitted by the second base station is maintained.

According to various embodiments of the disclosure, in operation 705, the electronic device 500 may measure a quality of the first cellular network through the RF resource.

According to various embodiments of the disclosure, the quality of the first cellular network may correspond to a quality of a signal transmitted by the second base station.

According to various embodiments of the disclosure, in operation 707, the electronic device 500 may identify whether the measured quality satisfies a designated condition.

According to various embodiments of the disclosure, the designated condition may include a condition with respect to whether the quality of a signal is equal to or greater than (or exceeds) a designated value related to a signal quality. Alternatively, the electronic device 500 may identify whether the quality measurement result is greater than a designated value related to a channel quality by a predetermined size (e.g., hysteresis) or more.

According to various embodiments of the disclosure, in operation 709, in response to identifying that a quality of a signal transmitted by the second base station satisfies a designated condition (operation 707—Y) (e.g., the quality of a signal transmitted by the second base station is greater than or equal to (or exceeds) a designated value), the electronic device 500 may maintain a state in which the RF resource is assigned to the first subscriber identity module 541 (or the first cellular network). An operation of maintaining a state in which the RF resource is assigned to the first subscriber identity module 541 may include an operation in which the communication processor 510 does not assign the RF resource to the second subscriber identity module 543 regardless of expiration of a first time.

According to various embodiments of the disclosure, the electronic device 500 may determine a maintenance time of a state in which the RF resource is assigned to the first subscriber identity module 541 based on a time required for performing connection between the second base station and the electronic device 500. According to an embodiment of the disclosure, the electronic device may configure a maintenance time of a state in which the RF resource is assigned to the first subscriber identity module 541 as the second time (TTT). According to another embodiment of the disclosure, the electronic device 500 may determine a time required for performing connection between the second base station and the electronic device 500 based on a record of performing connection with the second base station.

According to various embodiments of the disclosure, in operation 711, the electronic device 500 may perform an operation of connection with the second base station.

According to various embodiments of the disclosure, in case that the first cellular network supports non-standalone (NSA)-based 5G cellular communication, the first base station may be a base station supporting LTE communication and the second base station may be a base station supporting NSA-NR communication. In this case, the operation of connection with the second base station may include an operation in which the electronic device 500 performs connection with the second base station in a state of maintaining connection with the first base station.

According to various embodiments of the disclosure, in case that the first cellular network supports standalone (SA)-based 5G cellular communication, the first base station may be a base station supporting LTE and the second base station may be a base station supporting SA-NR communication. In this case, the operation of connection with the second base station may include an operation in which the electronic device 500 releases connection with the first base station and performs connection with the second base station.

According to various embodiments of the disclosure, the electronic device 500 may perform a connection procedure with the second base station while a state in which the RF resource is assigned to the first subscriber identity module 541 is maintained. The communication processor 510 may perform at least one operation for performing connection with the second base station, which includes a random access channel (RACH) corresponding to a procedure for initial access to a channel provided by the second base station and an access procedure through a channel provided by the second base station.

According to various embodiments of the disclosure, in operation 713, in case that the second time is expired or the connection procedure with the second base station is completed (e.g., RRC reconfiguration complete message indicating that the connection procedure is completed is received from the second base station), the electronic device 500 may assign the RF resource to the second subscriber identity module 543.

According to various embodiments of the disclosure, in a state in which the RF resource is assigned to the second subscriber identity module 543, the electronic device 500 may perform a series of operations for reception of a message (e.g., a paging message) transmitted by the second cellular network. According to an embodiment of the disclosure, the electronic device 500 may perform a tracking area update (TAU) operation to trace a position of the electronic device 500 by the second cellular network. Depending on the performance of the TAU operation, the electronic device 500 may be released from RRC connection with the second cellular network and converted into an RRC idle state. The electronic device 500 may identify that a series of operations for receiving a message transmitted by the second cellular network are completed and assign the RF resource to the first subscriber identity module 541 again. The electronic device 500 may perform data communication through the first cellular network by using RF resource.

According to various embodiments of the disclosure, in operation 715, the electronic device 500 may identify whether the first time is expired in response to identifying that the measured quality does not satisfy a designated condition (operation 707—N).

According to various embodiments of the disclosure, the electronic device 500 may identify whether the measured quality satisfies a designated condition (operation 707) in response to identifying that the first time is not expired (operation 715—N).

According to various embodiments of the disclosure, the electronic device 500 may assign the RF resource to the second subscriber identity module 543 (or the second cellular network) in response to identifying that the first time is expired (operation 715—Y).

According to various embodiments of the disclosure, in a state in which the RF resource is assigned to the second subscriber identity module 543, the electronic device 500 may perform a series of operations for reception of a message (e.g., a paging message) transmitted by the second cellular network. According to an embodiment of the disclosure, the electronic device 500 may perform a tracking area update (TAU) operation to allow the second cellular network to trace a position of the electronic device 500. The electronic device 500 may identify that a series of operations for receiving a message transmitted by the second cellular network are completed and assign the RF resource to the first subscriber identity module 541 again. The electronic device 500 may perform data communication through the first cellular network by using RF resource.

Figure 8:
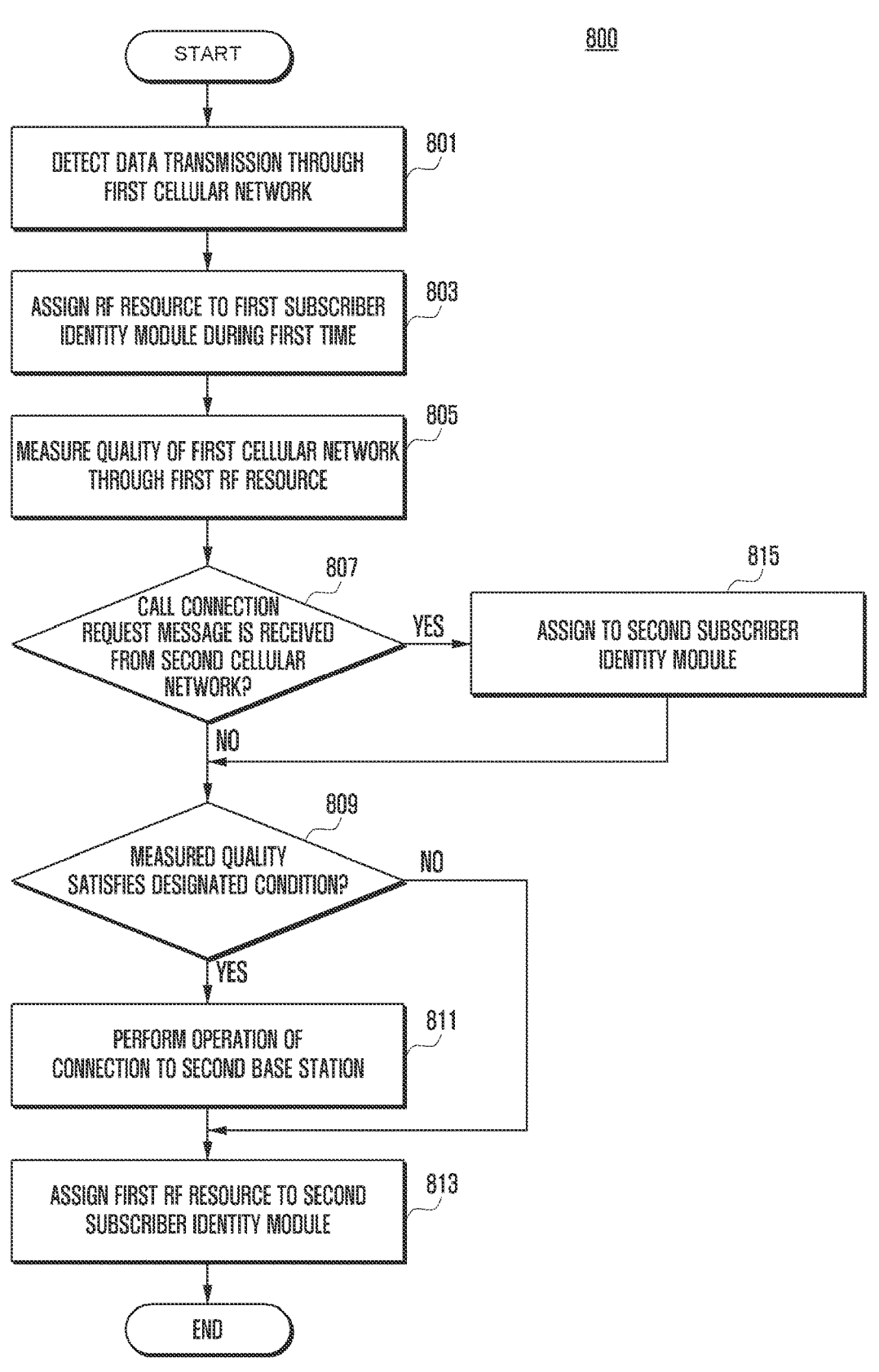
FIG. 8 is an operation flowchart illustrating a method of operating an electronic device according to an embodiment of the disclosure of the disclosure.

FIG. 8 is an operation flowchart 800 illustrating an operation method of an electronic device according to an embodiment of the disclosure.

The embodiments of FIG. 5 to FIG. 7 may correspond to embodiments in which the data transmission operation through the first cellular network and the second cellular network uses the same RF resource. However, the disclosure may be also applied to a case in which the data transmission operation through the first cellular network and the second cellular network shares at least some of the same RF resources (e.g., RF resources used for receiving signals).

According to various embodiments of the disclosure, in operation 801, an electronic device (e.g., the electronic device 500 in FIG. 5) may detect data communication through a first cellular network in a state of performing data transmission or reception through a second cellular network.

For example, in a state in which Internet data communication with the second cellular network is performed, according to detection of a user input requesting connection with the first cellular network or execution of an application performing cellular communication provided by the first cellular network, the electronic device 500 may detect triggering of data transmission through the first cellular network.

According to various embodiments of the disclosure, an RF resource included in a wireless communication circuit (e.g., the wireless communication circuit 530 in FIG. 5) may be assigned to a second subscriber identity module (e.g., the second subscriber identity module 543 in FIG. 5).

According to various embodiments of the disclosure, in operation 803, the electronic device 500 may assign a first RF resource to a first subscriber identity module (e.g., the first subscriber identity module 541 in FIG. 5) during a first time.

According to various embodiments of the disclosure, a wireless communication circuit (e.g., the wireless communication circuit 520 in FIG. 5) may include a first RF resource (not shown) for performing data transmission through one of the first cellular network and/or the second cellular network, a second RF resource for performing data reception through the first cellular network, and/or a third RF resource for performing data reception through the second cellular network. In case that the wireless communication circuit 520 includes the second RF resource for performing data reception through the first cellular network and the third RF resource for performing data reception through the second cellular network, data reception through the first cellular network and data reception through the second cellular network may be concurrently performed. However, in case that the wireless communication circuit 520 includes one RF resource (e.g., the first RF resource) in terms of data transmission, data transmission may be performed through one of the first cellular network and the second cellular network.

According to various embodiments of the disclosure, in order to receive a message (e.g., a paging message) transmitted by the second cellular network, the electronic device 500 may assign the first RF resource to the second subscriber identity module 543 after a first time (e.g., Sub-2 allocation time). The electronic device 500 may identify whether the first time is expired through a timer (e.g., Sub-2 allocation timer) for identifying whether the first time is expired and assign the first RF resource to the second subscriber identity module 543 in response to identifying that the first time is expired. The first time is a preconfigured time and may be received from the second cellular network.

According to various embodiments of the disclosure, the electronic device 500 may perform a connection procedure with a first base station (e.g., a base station supporting 4G mobile communication or a base station supporting an NSA mode of 5G mobile communication in case that the first cellular network supports the EN-DC) of the first cellular network through the first RF resource and/or a second RF resource.

According to various embodiments of the disclosure, the electronic device 500 may receive RRC configuration information from the first base station as a part of an operation to establish connection with the first cellular network. The RRC configuration information may include information on a condition for transmitting a measurement result of a quality of a signal (e.g., a reference signal) transmitted by the second base station to the second base station (e.g., a base station supporting 5G mobile communication or a base station supporting a SA mode of 5G mobile communication in case that the first cellular network supports the EN-DC). For example, the information on a condition for transmitting a measurement result of a quality of a signal (e.g., a reference signal) transmitted by the second base station may correspond to information related to a quality measurement request event (B1 event) for a signal transmitted by the second base station and may include a designated value (B1 threshold) related to a quality of a signal transmitted by the second base station and/or a second time (time to trigger, TTT) during which a quality of a signal transmitted by the second base station is maintained.

According to various embodiments of the disclosure, in operation 805, the electronic device 500 may measure a quality of the first cellular network through the first RF resource.

According to various embodiments of the disclosure, the quality of the first cellular network may correspond to a quality of a signal transmitted by the second base station.

According to various embodiments of the disclosure, in operation 807, the electronic device 500 may identify whether a call connection request message (e.g., an INVITE message) is received from the second cellular network.

According to various embodiments of the disclosure, in response to reception (operation 807—Y) of a call connection request message (e.g., an INVITE message) from the second cellular network, the electronic device 500 may assign the first RF resource to the second subscriber identity module 543 and transmit and receive data (e.g., voice data or video data) through the second cellular network. The electronic device 500 may measure a quality of a channel provided by the second base station through the second RF resource while transmitting and receiving data (e.g., voice data or video data) through the second cellular network.

According to various embodiments of the disclosure, in operation 809, the electronic device 500 may identify whether the measured quality satisfies a designated condition.

According to various embodiments of the disclosure, the designated condition may include a condition with respect to whether the quality of a signal is equal to or greater than (or exceeds) a designated value related to a quality of a signal transmitted by the second base station. Alternatively, the electronic device 500 may identify whether the quality measurement result is greater than a designated value related to a signal quality by a predetermined size (e.g., hysteresis) or more.

According to various embodiments of the disclosure, in operation 811, in response to identifying that a quality of a signal transmitted by the second base station satisfies a designated condition (operation 809—Y) (e.g., the quality of a signal transmitted by the second base station is greater than or equal to (or exceeds) a designated value), the electronic device 500 may maintain a state in which the first RF resource assigned to the first subscriber identity module 541 (or the first cellular network) (or in case that a call connection request message is received from the second cellular network, assign the first RF resource to the first subscriber identity module 541). An operation of maintaining a state in which the first RF resource assigned to the first subscriber identity module 541 may include an operation in which the communication processor 510 does not assign the first RF resource to the second subscriber identity module 543 regardless of expiration of a first time.

According to various embodiments of the disclosure, the electronic device 500 may determine a maintenance time of a state in which the first RF resource is assigned to the first subscriber identity module 541 based on a time required for performing connection between the second base station and the electronic device 500. According to an embodiment of the disclosure, the electronic device 500 may configure a maintenance time of a state in which the first RF resource is assigned to the first subscriber identity module 541 as a time greater than the second time (TTT). According to another embodiment of the disclosure, the electronic device 500 may determine a time required for performing connection between the second base station and the electronic device 500 based on a record of performing connection with the second base station.

According to various embodiments of the disclosure, in operation 813, the electronic device 500 may perform an operation of connection to the second base station.

According to various embodiments of the disclosure, in case that the first cellular network supports non-standalone (NSA)-based 5G cellular communication, the first base station may be a base station supporting LTE communication and the second base station may be a base station supporting non-standalone (NSA)-NR communication. In this case, a hand-over operation of the first cellular network may include an operation in which the electronic device 500 performs connection with the second base station in a state of maintaining connection with the first base station.

According to various embodiments of the disclosure, in case that the first cellular network supports standalone (SA)-based 5G cellular communication, the first base station may be a base station supporting LTE communication and the second base station may be a base station supporting SA-NR communication. In this case, a hand-over operation of the first cellular network may include an operation in which the electronic device 500 releases connection with the first base station and performs connection with the second base station.

According to various embodiments of the disclosure, the electronic device 500 may perform a connection procedure with the second base station while a state in which the first RF resource is assigned to the first subscriber identity module 541 is maintained. The communication processor 510 may perform at least one operation for performing connection with the second base station, which includes a random access channel (RACH) corresponding to a procedure for initial access to a channel provided by the second base station and an access procedure through a channel provided by the second base station.

According to various embodiments of the disclosure, in operation 815, in case that the second time is expired or the connection procedure with the second base station is completed (e.g., RRC reconfiguration complete message indicating that the connection procedure is completed is received from the second base station), the electronic device 500 may assign the first RF resource to the second subscriber identity module 543.

According to various embodiments of the disclosure, in a state in which the first RF resource is assigned to the second subscriber identity module 543, the electronic device 500 may perform a series of operations for reception of a message (e.g., a paging message) transmitted by the second cellular network. According to an embodiment of the disclosure, the electronic device 500 may perform a tracking area update (TAU) operation to allow the second cellular network to trace a position of the electronic device 500. The electronic device 500 may identify that a series of operations for receiving a message transmitted by the second cellular network are completed and assign the first RF resource to the first subscriber identity module 541 again. The electronic device 500 may perform data communication through the first cellular network by using RF resource.

A method of operating an electronic device according to various embodiments of the disclosure may include an operation of detecting activation of a data transmission operation through a first cellular network in a state in which data transmission or reception is performed through a second cellular communication network, an operation of assigning an RF resource to a first subscriber identity module corresponding to the first cellular network during a first time in response to the activation of the data transmission operation through the first cellular network, an operation of measuring a quality of a channel corresponding to the first cellular network during the first time through the RF resource, an operation of further maintaining a state in which the RF resource is assigned to the first subscriber identity module during a second time in response to identifying that the measured quality satisfies a preconfigured condition, and an operation of assigning the RF resource to the second subscriber identity module corresponding to the second cellular network again after the second time expires.

In the method of operating the electronic device according to various embodiments of the disclosure, the operation of maintaining the state in which the RF resource is assigned to the first subscriber identity module during the second time may include an operation of performing at least one operation configured to perform connection with the first cellular network while a state in which the RF resource is assigned to the first subscriber identity module is maintained during the second time.

The method of operating the electronic device according to various embodiments of the disclosure may further include an operation of assigning the RF resource to the second subscriber identity module again in response to reception from the first cellular network of a message indicating completion of connection with the first cellular network.

The method of operating the electronic device according to various embodiments of the disclosure may further include an operation of performing, through the RF resource, a procedure for configuring the RF resource to be assigned to the second subscriber identity module again and then a paging message to be received from the second cellular network.

The method of operating the electronic device according to various embodiments of the disclosure may further include an operation of assigning the RF resource to the first subscriber identity module again in response to completion of the procedure for configuring the paging message to be received.

The method of operating the electronic device according to various embodiments of the disclosure may further include an operation of assigning the RF resource to the second subscriber identity module in response to identifying that the measured quality does not satisfy the preconfigured condition.

The method of operating the electronic device according to various embodiments of the disclosure may further include an operation of transmitting a quality measurement result of a signal transmitted by the second base station of the second cellular network to the first base station of the first cellular network, while maintaining a state in which the RF resource is assigned to the first subscriber identity module during the second time.

In the method of operating the electronic device according to various embodiments of the disclosure may further include, the first cellular network may correspond to 4G mobile communication network for supporting E-UTRA-NR-Dual-Connectivity (EN-DC) or standalone (SA) and the second cellular network may correspond to 5G mobile communication network for supporting EN-DC or SA.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first subscriber identity module (SIM) configured to store a first profile related to a first cellular network;
a second SIM configured to store a second profile related to a second cellular network;
communication circuitry including a radio frequency (RF) resource configured to perform data transmission and/or reception through one of the first cellular network and the second cellular network;
memory storing instructions; and
at least one processor,
wherein the instructions, when executed by the at least one processor, cause the electronic device to:
assign the RF resource to the first SIM during a first time and connect to a first base station of the first cellular network, wherein the RF resource is assigned to the second SIM after the first time is expired,
determine whether a condition for transmitting, to the first base station, a measurement report of a quality of signal received from a second base station of the first cellular network is satisfied,
based on determination that the condition is satisfied, refrain from assigning the RF resource to the second SIM after the first time is expired, wherein the assignment of the RF resource to the first SIM is maintained, and
assign the RF resource to the second SIM after a second time expires.

2. The electronic device of claim 1, wherein the at least one processor is further configured to perform at least one operation configured to perform connection to the second base station while a state in which the RF resource is assigned to the first SIM is further maintained during the second time.

3. The electronic device of claim 1, wherein the at least one processor is further configured to assign the RF resource to the second SIM again in response to reception from the first cellular network of a message indicating completion of connection with the second base station.

4. The electronic device of claim 1, wherein the at least one processor is further configured to perform, through the RF resource, a procedure for configuring the RF resource to be assigned to the second SIM again and then a paging message to be received from the second cellular network.

5. The electronic device of claim 4, wherein the procedure for configuring the paging message to be received comprises a tracking area update (TAU) procedure.

6. The electronic device of claim 4, wherein the at least one processor is further configured to assign the RF resource to the first SIM again in response to completion of the procedure for configuring the paging message to be received.

7. The electronic device of claim 1, wherein the at least one processor is further configured to assign the communication circuitry to the second SIM after the first time is expired based on the determination that the condition for performing the handover from the first base station to the second base station is not satisfied.

8. The electronic device of claim 1, wherein the at least one processor is further configured to transmit a quality measurement result of a signal transmitted by the second base station of the first cellular network to the first base station of the first cellular network, while maintaining a state in which the RF resource is assigned to the first SIM during the second time.

9. The electronic device of claim 1, wherein the second time is included in information transmitted by the first cellular network.

10. The electronic device of claim 9, wherein the information transmitted by the first cellular network is included in a radio resource control (RRC) reconfiguration message received through the first cellular network during attempting a connection operation with the first cellular network after assigning the RF resource to the first SIM in response to activation of a data transmission operation through the first cellular network.

11. The electronic device of claim 1, wherein the first cellular network corresponds to 4G mobile communication network configured to support evolved universal mobile telecommunications system (UMTS) terrestrial radio access network (E-UTRA-NR)-Dual-Connectivity (EN-DC) or standalone (SA) and the second cellular network corresponds to 5G mobile communication network configured to support EN-DC or SA.

12. A method of operating an electronic device configured to support a first cellular network and a second cellular network, the method comprising:

assigning a radio frequency (RF) resource to a first subscriber identity module (SIM) corresponding to the first cellular network during a first time and connecting to a first base station of the first cellular network, wherein the RF resource is assigned to a second SIM corresponding to the second cellular network after the first time is expired;

determining whether a condition for transmitting, to the first base station, a measurement report of a quality of signal received from a second base station of the first cellular network is satisfied;

based on the determination that the condition is satisfied, refraining from assigning the RF resource to the second SIM after the first time is expired, wherein the assignment of the RF resource to the first SIM is maintained; and assigning the RF resource to a second SIM corresponding to the second cellular network again after second time expires.

13. The method of claim 12, wherein the refraining from assigning the RF resource to the second SIM comprises performing at least one operation configured to perform connection with the first cellular network while a state in which the RF resource is assigned to the first SIM is maintained during the second time.

14. The method of claim 12, further comprising assigning the RF resource to the second SIM again in response to reception from the first cellular network of a message indicating completion of connection with the second base station.

15. The method of claim 12, further comprising performing, through the RF resource, a procedure for configuring the RF resource to be assigned to the second SIM again and then a paging message to be received from the second cellular network.

* * * * *